(12) United States Patent
Crist et al.

(10) Patent No.: US 9,681,610 B2
(45) Date of Patent: Jun. 20, 2017

(54) INTEGRATED CONTROL CIRCUITRY AND COIL ASSEMBLY FOR IRRIGATION CONTROL

(71) Applicant: Rain Bird Corporation, Azusa, CA (US)

(72) Inventors: Timothy J. Crist, Tucson, AZ (US); Matthew S. Prucinsky, Vail, AZ (US); Michael A. Lorenz, Rancho Cucamonga, CA (US)

(73) Assignee: Rain Bird Corporation, Azusa, CA (US)

( * ) Notice: Subject to any disclaimer, the term of this patent is extended or adjusted under 35 U.S.C. 154(b) by 12 days.

(21) Appl. No.: 14/507,751

(22) Filed: Oct. 6, 2014

(65) Prior Publication Data

US 2015/0088324 A1 Mar. 26, 2015

Related U.S. Application Data

(63) Continuation of application No. 12/510,111, filed on Jul. 27, 2009, now Pat. No. 8,851,447, which is a continuation-in-part of application No. 11/228,413, filed on Sep. 15, 2005, now Pat. No. 7,826,931.

(51) Int. Cl.
*A01G 25/16* (2006.01)
*H02K 15/00* (2006.01)

(52) U.S. Cl.
CPC ............ *A01G 25/16* (2013.01); *H02K 15/00* (2013.01); *Y10T 29/49009* (2015.01)

(58) Field of Classification Search
CPC ....... A01G 25/16; G05D 7/0623; H02K 15/00
See application file for complete search history.

(56) References Cited

U.S. PATENT DOCUMENTS

| | | | |
|---|---|---|---|
| 3,547,154 | A | 12/1970 | Benham |
| 3,729,710 | A | 4/1973 | Sherwin |
| 3,747,620 | A | 7/1973 | Kah |
| 3,941,348 | A | 3/1976 | Mott |
| 3,989,066 | A | 11/1976 | Sturman |
| 4,007,458 | A | 2/1977 | Hollabaugh |
| 4,022,244 | A | 5/1977 | Oman |
| D246,377 | S | 11/1977 | Pansini |
| 4,065,722 | A | 12/1977 | Francis |
| 4,121,114 | A | 10/1978 | Ruggles |
| 4,131,882 | A | 12/1978 | Hollabaugh |

(Continued)

FOREIGN PATENT DOCUMENTS

| | | |
|---|---|---|
| CN | 1345531 | 4/2002 |
| CN | 1511383 | 7/2004 |

(Continued)

OTHER PUBLICATIONS

EPO; App. No. 06018783.8; Extended European Search Report mailed Nov. 5, 2012.

(Continued)

*Primary Examiner* — Eric Keasel
(74) *Attorney, Agent, or Firm* — Fitch, Even, Tabin & Flannery LLP

(57) ABSTRACT

An integrated irrigation valve control device has a coil adapted to develop an electromagnetic flux sufficient to cause actuation of irrigation equipment. Control circuitry is electrically coupled to the coil to control the flux at the coil. A housing covers at least a portion of the coil and at least a portion of the control circuitry.

26 Claims, 20 Drawing Sheets

(56) References Cited

U.S. PATENT DOCUMENTS

| | | |
|---|---|---|
| 4,165,532 A | 8/1979 | Kendall |
| 4,176,395 A | 11/1979 | Evelyn-Veere |
| 4,241,375 A | 12/1980 | Ruggles |
| 4,423,484 A | 12/1983 | Hamilton |
| 4,535,401 A | 8/1985 | Penn |
| 4,548,225 A | 10/1985 | Busalacchi |
| 4,556,864 A | 12/1985 | Roy |
| 4,562,506 A | 12/1985 | Moran |
| 4,596,266 A | 6/1986 | Kinghorn |
| 4,645,882 A | 2/1987 | Nakayama |
| 4,716,490 A | 12/1987 | Alexanian |
| 4,718,454 A | 1/1988 | Appleby |
| D294,964 S | 3/1988 | Mendenhall |
| D297,929 S | 10/1988 | Hughes |
| 4,777,556 A | 10/1988 | Imran |
| 4,811,221 A | 3/1989 | Sturman |
| 5,008,664 A | 4/1991 | More |
| 5,021,939 A | 6/1991 | Pulgiese |
| 5,048,755 A | 9/1991 | Dodds |
| 5,079,667 A | 1/1992 | Kasano |
| 5,100,056 A | 3/1992 | Theodorsen |
| 5,229,649 A | 7/1993 | Nielsen |
| 5,251,153 A | 10/1993 | Nielsen |
| 5,333,785 A | 8/1994 | Dodds |
| 5,347,421 A | 9/1994 | Alexanian |
| 5,402,303 A | 3/1995 | Luck |
| D361,057 S | 8/1995 | Fayfield |
| 5,485,400 A | 1/1996 | Warrior |
| 5,638,847 A | 6/1997 | Hoch |
| 5,649,818 A | 7/1997 | Day |
| 5,655,561 A | 8/1997 | Wendel |
| 5,661,349 A | 8/1997 | Luck |
| 5,740,031 A | 4/1998 | Gagnon |
| 5,760,706 A | 6/1998 | Kiss |
| 5,780,938 A | 7/1998 | Edwards |
| 5,825,664 A | 10/1998 | Warrior |
| 5,826,619 A | 10/1998 | Roman |
| 5,839,658 A | 11/1998 | Sarver |
| 5,848,609 A | 12/1998 | Marchesseault |
| 5,914,847 A | 6/1999 | Alexanian |
| 5,938,172 A | 8/1999 | Ohtsuka |
| 6,021,038 A | 2/2000 | Hanchett |
| 6,126,141 A | 10/2000 | Geiger |
| 6,154,354 A | 11/2000 | Alexanian |
| 6,283,139 B1 | 9/2001 | Symonds |
| 6,335,855 B1 | 1/2002 | Alexanian |
| 6,337,635 B1 | 1/2002 | Ericksen |
| 6,351,366 B1 | 2/2002 | Alexanian |
| 6,378,838 B1 | 4/2002 | Brundisini |
| 6,460,563 B2 | 10/2002 | Olson |
| D470,823 S | 2/2003 | Ufer |
| D477,287 S | 7/2003 | Roman |
| 6,652,188 B1 | 11/2003 | Albright |
| 6,694,223 B1 | 2/2004 | Goldberg |
| 6,721,630 B1 | 4/2004 | Woytowitz |
| 6,763,287 B2 | 7/2004 | Brundisini |
| 6,766,221 B1 | 7/2004 | Christiansen |
| 6,782,310 B2 | 8/2004 | Bailey |
| 6,782,311 B2 | 8/2004 | Barlow |
| 6,783,287 B2 | 8/2004 | Kudo |
| 6,812,826 B2 | 11/2004 | Buhler |
| 6,842,667 B2 | 1/2005 | Beutler |
| 6,898,467 B1 | 5/2005 | Smith |
| 6,948,697 B2 | 9/2005 | Herbert |
| 6,971,684 B2 | 12/2005 | Ferrari |
| 6,993,416 B2 | 1/2006 | Christiansen |
| 7,058,479 B2 | 6/2006 | Miller |
| 7,069,115 B1 | 6/2006 | Woytowitz |
| 7,084,741 B2 | 8/2006 | Plummer |
| 7,123,993 B1 | 10/2006 | Freeman |
| 7,146,225 B2 | 12/2006 | Guenst |
| 7,146,255 B2 | 12/2006 | Christiansen |
| 7,181,319 B1 | 2/2007 | Woytowtiz |
| 7,182,272 B1 | 2/2007 | Marian |
| 7,206,669 B2 | 4/2007 | Christiansen |
| D542,682 S | 5/2007 | Waki |
| 7,245,991 B1 | 7/2007 | Woytowitz |
| 7,248,945 B2 | 7/2007 | Woytowitz |
| 7,257,465 B2 | 8/2007 | Perez |
| 7,273,206 B2 | 9/2007 | Sato |
| 7,286,904 B2 | 10/2007 | Graham |
| 7,289,862 B2 | 10/2007 | Britton |
| 7,358,626 B2 | 4/2008 | Gardner |
| 7,359,769 B2 | 4/2008 | Bailey |
| 7,383,721 B2 | 6/2008 | Parsons |
| 7,398,139 B1 | 7/2008 | Woytowitz |
| 7,403,840 B2 | 7/2008 | Moore |
| 7,406,363 B2 | 7/2008 | Doering |
| 7,421,317 B2 | 9/2008 | Christiansen |
| 7,444,207 B2 | 10/2008 | Nickerson |
| 7,458,521 B2 | 12/2008 | Ivans |
| 7,474,024 B2 | 1/2009 | Nakanishi |
| 7,526,365 B1 | 4/2009 | Frerich |
| 7,574,285 B2 | 8/2009 | Kah, Jr. |
| 7,613,547 B1 | 11/2009 | Woytowitz |
| 7,640,079 B2 | 12/2009 | Nickerson |
| D611,001 S | 3/2010 | Ihde |
| D622,226 S | 8/2010 | Crist |
| 7,772,726 B1 | 8/2010 | Porter |
| 7,792,612 B2 | 9/2010 | Kah, Jr. |
| 7,826,931 B2 | 11/2010 | Lorenz |
| 7,883,027 B2 | 2/2011 | Fekete |
| 7,899,581 B1 | 3/2011 | Woytowitz |
| 7,930,069 B2 | 4/2011 | Savelle |
| 7,953,517 B1 | 5/2011 | Porter |
| 8,019,482 B2 | 9/2011 | Sutardja |
| 8,024,075 B2 | 9/2011 | Fekete |
| 8,104,993 B2 | 1/2012 | Hitt |
| 8,108,078 B2 | 1/2012 | Lorenz |
| 8,160,750 B2 | 4/2012 | Weiler |
| 8,170,721 B2 | 5/2012 | Nickerson |
| 8,193,930 B2 | 6/2012 | Petite |
| 8,200,368 B2 | 6/2012 | Nickerson |
| 8,224,493 B2 | 7/2012 | Walker |
| 8,260,465 B2 | 9/2012 | Crist |
| 8,274,171 B2 | 9/2012 | Korol |
| 8,295,985 B2 | 10/2012 | Crist |
| 8,532,831 B2 | 9/2013 | Crist |
| 8,659,183 B2 | 2/2014 | Crist |
| 8,793,025 B2 | 7/2014 | Lorenz |
| 8,840,084 B2 | 9/2014 | Crist |
| 8,851,447 B2 | 10/2014 | Crist |
| 8,909,381 B2 | 12/2014 | Crist |
| 2002/0035414 A1 | 3/2002 | Morikawa |
| 2002/0053970 A1 | 5/2002 | Plummer |
| 2002/0071234 A1 | 6/2002 | Alexanian |
| 2002/0085333 A1 | 7/2002 | Alexanian |
| 2002/0088875 A1 | 7/2002 | Sirkin |
| 2002/0091452 A1 | 7/2002 | Addink |
| 2002/0166986 A1 | 11/2002 | Remby |
| 2003/0006882 A1 | 1/2003 | Buhler |
| 2003/0120393 A1 | 6/2003 | Bailey |
| 2003/0135286 A1 | 7/2003 | Brundisini |
| 2003/0179102 A1 | 9/2003 | Barnes |
| 2003/0201675 A1 | 10/2003 | Alexanian |
| 2004/0039489 A1 | 2/2004 | Moore |
| 2004/0046137 A1 | 3/2004 | Herbert |
| 2004/0086053 A1 | 5/2004 | Anderson |
| 2004/0225412 A1 | 11/2004 | Alexanian |
| 2005/0004715 A1 | 1/2005 | Christiansen |
| 2005/0038529 A1 | 2/2005 | Perez |
| 2005/0055106 A1 | 3/2005 | Beutler |
| 2005/0087620 A1 | 4/2005 | Bowers |
| 2005/0156067 A1 | 7/2005 | Ivans |
| 2005/0156068 A1 | 7/2005 | Ivans |
| 2005/0264973 A1 | 12/2005 | Gardner |
| 2005/0273205 A1 | 12/2005 | Nickerson |
| 2006/0043208 A1 | 3/2006 | Graham |
| 2006/0080003 A1 | 4/2006 | Christiansen |
| 2006/0091245 A1 | 5/2006 | Ivans |
| 2006/0116793 A1 | 6/2006 | Christiansen |
| 2006/0206239 A1 | 9/2006 | Christiansen |
| 2007/0035907 A1 | 2/2007 | Doering |
| 2007/0061048 A1 | 3/2007 | Lorenz |

(56) References Cited

U.S. PATENT DOCUMENTS

| | | |
|---|---|---|
| 2007/0106426 A1 | 5/2007 | Ensworth |
| 2007/0179674 A1 | 8/2007 | Ensworth |
| 2007/0221750 A1 | 9/2007 | Roberts |
| 2007/0282486 A1 | 12/2007 | Walker |
| 2008/0027587 A1 | 1/2008 | Nickerson |
| 2008/0039978 A1 | 2/2008 | Graham |
| 2008/0058995 A1 | 3/2008 | Holindrake |
| 2008/0157995 A1 | 7/2008 | Crist |
| 2008/0211307 A1 | 9/2008 | Gardner |
| 2008/0275595 A1 | 11/2008 | Bailey |
| 2008/0288117 A1 | 11/2008 | Nickerson |
| 2008/0319585 A1 | 12/2008 | Nickerson |
| 2009/0076659 A1 | 3/2009 | Ensworth |
| 2009/0076660 A1 | 3/2009 | Goldberg |
| 2009/0120521 A1 | 5/2009 | Clark |
| 2009/0138131 A1 | 5/2009 | Uy |
| 2009/0150001 A1 | 6/2009 | Fekete |
| 2009/0150002 A1 | 6/2009 | Fekete |
| 2009/0222140 A1 | 9/2009 | Christiansen |
| 2009/0292401 A1 | 11/2009 | Kah |
| 2010/0004789 A1 | 1/2010 | Savelle |
| 2010/0030476 A1 | 2/2010 | Woytowitz |
| 2010/0082169 A1 | 4/2010 | Crist |
| 2010/0094472 A1 | 4/2010 | Woytowitz |
| 2010/0100247 A1 | 4/2010 | Nickerson |
| 2010/0131119 A1 | 5/2010 | Brundisini |
| 2010/0145530 A1 | 6/2010 | Nickerson |
| 2010/0145531 A1 | 6/2010 | Nickerson |
| 2010/0161144 A1 | 6/2010 | Crist |
| 2010/0268392 A1 | 10/2010 | Korol |
| 2011/0015793 A1 | 1/2011 | Crist |
| 2011/0015794 A1 | 1/2011 | Lorenz |
| 2011/0015800 A1 | 1/2011 | Crist |
| 2011/0017845 A1 | 1/2011 | Crist |
| 2011/0035064 A1 | 2/2011 | Kah |
| 2011/0040415 A1 | 2/2011 | Nickerson |
| 2011/0040416 A1 | 2/2011 | Nickerson |
| 2011/0077785 A1 | 3/2011 | Nickerson |
| 2011/0190947 A1 | 8/2011 | Savelle |
| 2011/0190948 A1 | 8/2011 | Fekete |
| 2011/0224836 A1 | 9/2011 | Hern |
| 2012/0085950 A1 | 4/2012 | Lorenz |
| 2012/0089259 A1 | 4/2012 | Williams |
| 2012/0203383 A1 | 8/2012 | Holindrake |
| 2012/0303169 A1 | 11/2012 | Crist |
| 2013/0002012 A1 | 1/2013 | Korol |
| 2014/0039698 A1 | 2/2014 | Crist |
| 2014/0297049 A1 | 10/2014 | Lorenz |

FOREIGN PATENT DOCUMENTS

| | | |
|---|---|---|
| EP | 0748584 A1 | 12/1996 |
| EP | 1324166 A2 | 7/2003 |
| EP | 1763990 A2 | 3/2007 |
| EP | 2281445 | 2/2011 |
| GB | 2177582 A | 1/1987 |
| WO | 8606579 A1 | 11/1986 |
| WO | 02058254 A1 | 7/2002 |
| WO | 2005002321 A2 | 1/2005 |
| WO | 2011017059 A2 | 2/2011 |

OTHER PUBLICATIONS

EPO; App. No. 10 170 920; Exam Report mailed Dec. 19, 2012.
EPO; App. No. EP 06 01 8783; Supplementary Partial European Search Report mailed Dec. 15, 2011.
EPO; App. No. EP 10170920.2; European Search Report mailed Mar. 8, 2012.
Michrochip Technology Inc.; PIC/16F631/677/685/687,689/690 Data Sheet; 20-Pin Flash-Based, 8-Bit CMOS Microcontollers with Nano Watt Technology; 2006; 294 pages.
PCT; App. No. PCT/US2010/043273; International Search Report mailed Mar. 2, 2011; 3 pages.
PCT; App. No. PCT/US2010/043273; Written Opinion of the International Searching Authority mailed Mar. 2, 2011; 3 pages.
Rain Bird, 'FD Field Decoders: Rain Bird Decoders', Feb. 17, 2005, pp. 1-4, printed from www.rainbird.com/golf/products/centralcontrol/decoders.htm, Rain Bird Corporation, Glendora, CA.
Rain Bird, 'Full/Part Circle Roters', Oct. 2004, pp. 1-4, Catalog No. 438, Rain Bird Corporation, Glendora, CA.
Rain Bird, 'Tech Specs: Rain Bird Decoders', Oct. 2004, Rain Bird Corporation Golf Division, Tucson, AZ. (2 pages).
Rain Bird, "Master Parts Book 2008-2009", Jan. 2008, pp. 129-130, 140, Rain Bird Corporation, Parts and Service Center, Azusa, CA.
Rain Bird, "Maxicom2 Decoders: Sensor-Pulse", Sep. 2002, pp. 1-2, Rain Bird Corporation, Azusa, CA.
Rain Bird, "Rain Bird Latching Solenoid: Part No. 231831", 1999, Rain Bird Corporation, Tucson, AZ.
Rain Bird, "Rain Bird MDC Decoder-based Control System", Jan. 2006, pp. 1-4, Rain Bird Corporation, Azusa, CA.
SIPO; App. No. 201080037966.2; Office Action and partial summary translation provided by Chinese Associate mailed Jan. 6, 2014.
SIPO; App. No. 201080037966.2; Office Action mailed Sep. 3, 2014.
The Toro Company; 'Golf Decoder Control System (GDC)'; Jun. 25, 2007, pp. 1, printed from http://web.archive.org/web/20070625035525/www.toro.com/irrigation/golf/lgturffield/gdc/index.html, The Toro Company, Bloomington, MN.
U.S. Appl. No. 11/228,413; Examiner Interview Summary mailed Apr. 22, 2009.
U.S. Appl. No. 11/228,413; Examiner Interview Summary mailed Dec. 7, 2009.
U.S. Appl. No. 11/228,413; Notice of Allowance mailed Jun. 18, 2010.
U.S. Appl. No. 11/228,413; Notice of Panel Decision from Pre-Appeal Brief Review mailed Apr. 28, 2010.
U.S. Appl. No. 11/228,413; Office Action mailed Apr. 2, 2008.
U.S. Appl. No. 11/228,413; Office Action mailed May 20, 2009.
U.S. Appl. No. 11/228,413; Office Action mailed Dec. 2, 2008.
U.S. Appl. No. 11/228,413; Office Action mailed Dec. 7, 2009.
U.S. Appl. No. 11/228,413; Supplemental Notice of Allowance mailed Aug. 5, 2010.
U.S. Appl. No. 11/228,413; Supplemental Notice of Allowance mailed Sep. 2, 2010.
U.S. Appl. No. 12/510,111; Notice of Allowance mailed Apr. 2, 2014.
U.S. Appl. No. 12/510,111; Notice of Allowance mailed May 16, 2014.
U.S. Appl. No. 12/510,111; Office Action mailed Jun. 4, 2013.
U.S. Appl. No. 12/510,111; Office Action mailed Oct. 16, 2012.
U.S. Appl. No. 12/510,111; Office Action mailed Dec. 27, 2013.
U.S. Appl. No. 12/510,111; Office Action mailed Feb. 29, 2012.
U.S. Appl. No. 12/510,118; Notice of Allowance mailed Apr. 2, 2014.
U.S. Appl. No. 12/510,118; Notice of Allowance mailed May 16, 2014.
U.S. Appl. No. 12/510,118; Office Action mailed Jun. 5, 2013.
U.S. Appl. No. 12/510,118; Office Action mailed Oct. 16, 2012.
U.S. Appl. No. 12/510,118; Office Action mailed Dec. 30, 2013.
U.S. Appl. No. 12/510,118; Office Action mailed Feb. 29, 2012.
U.S. Appl. No. 12/866,471; Office Action mailed Mar. 17, 2011.
U.S. Appl. No. 12/886,471; Notice of Allowance mailed Sep. 20, 2011.
U.S. Appl. No. 12/886,471; Supplemental Notice of Allowance mailed Oct. 19, 2011.
U.S. Appl. No. 13/332,337; Notice of Allowance mailed Mar. 13, 2014.
U.S. Appl. No. 13/332,337; Notice of Allowance mailed Dec. 6, 2013.
U.S. Appl. No. 14/304,502; Office Action mailed Jul. 12, 2016.
U.S. Appl. No. 14/493,106; Office Action mailed Apr. 21, 2016.
U.S. Appl. No. 14/493,106; Office Action mailed Oct. 11, 2016.

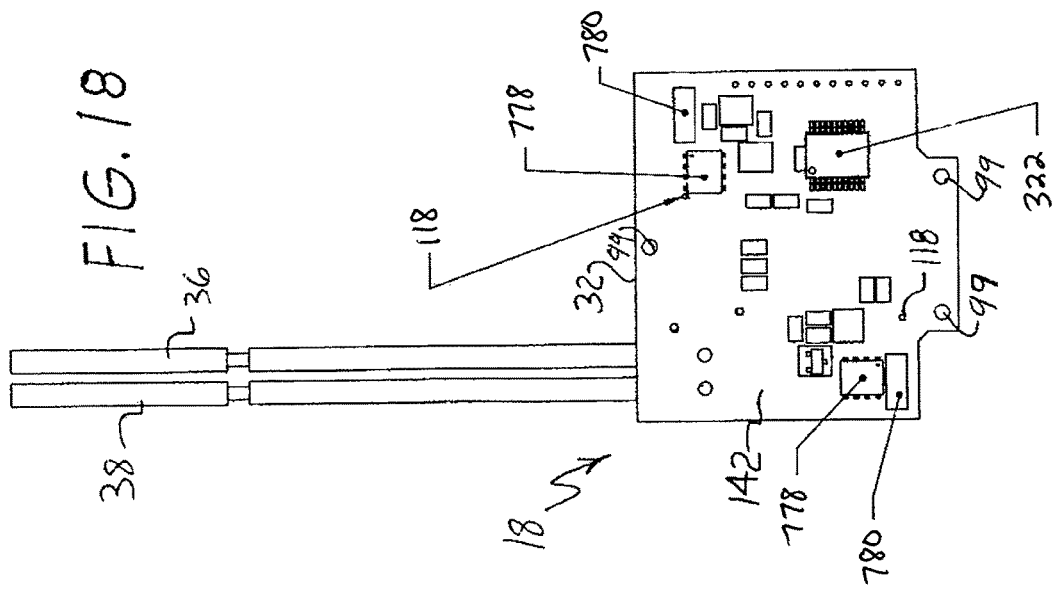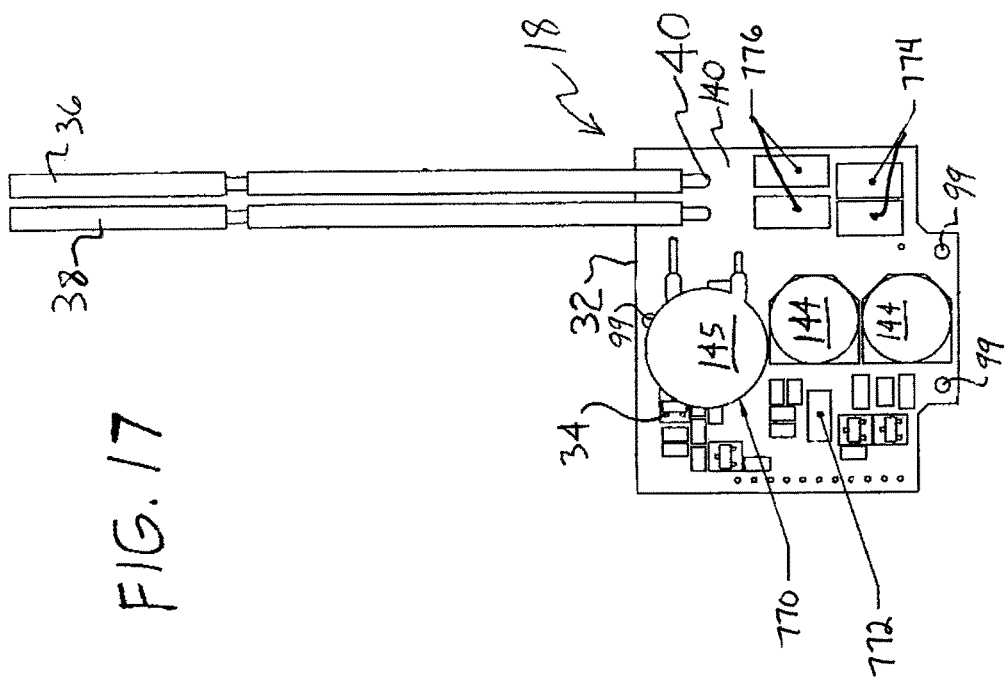

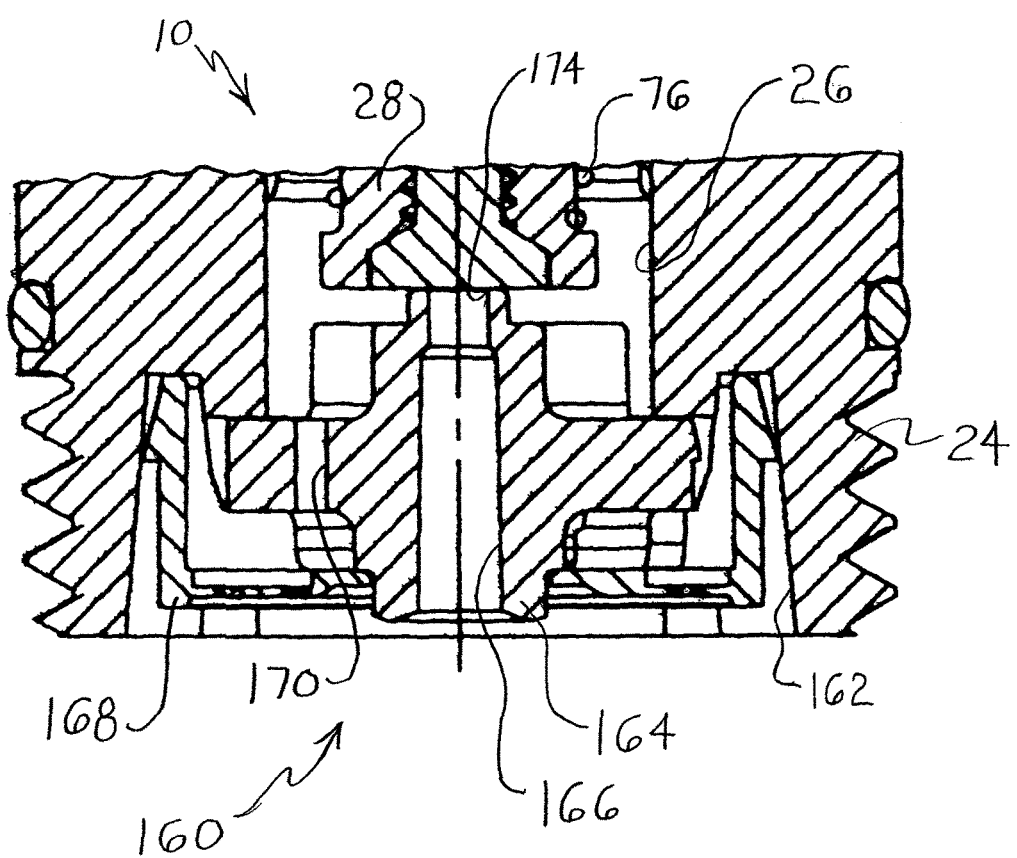

INTEGRATED CONTROL CIRCUITRY AND COIL ASSEMBLY FOR IRRIGATION CONTROL

CROSS-REFERENCE TO RELATED APPLICATION

This application is a continuation of U.S. patent application Ser. No. 12/510,111, filed Jul. 27, 2009, which is a continuation-in-part of U.S. patent application Ser. No. 11/228,413, filed Sep. 15, 2005, now U.S. Pat. No. 7,826,931, issued Nov. 2, 2010, all of which are incorporated herein by reference in their entirety for all purposes.

This application is also related to: U.S. patent application Ser. No. 12/510,118, filed Jul. 29, 2009; U.S. patent application Ser. No. 14/931,106, filed Sep. 22, 2014; U.S. patent application Ser. No. 12/886,471, filed Sep. 20, 2010, now U.S. Pat. No. 8,108,078, issued Jan. 31, 2012; U.S. patent application Ser. No. 13/332,337, filed Dec. 20, 2011, now U.S. Pat. No. 8,793,025, issued Jul. 29, 2014; and U.S. patent application Ser. No. 14/304,502, filed Jun. 13, 2014, all of which are incorporated herein by reference in their entirety for all purposes.

BACKGROUND OF THE INVENTION

1. Field of the Invention

The present invention relates generally to irrigation control devices and more specifically to multi-wire irrigation control systems including remote devices coupled to a multi-wire path and for coupling to actuator coil-controlled irrigation equipment.

2. Discussion of the Related Art

In decoder-based irrigation control systems, an irrigation controller sends signaling along a wire path to which one or more decoder devices are attached. Each decoder device monitors transmissions on the wire path and decodes this signaling to determine when to cause irrigation devices coupled thereto to be activated and deactivated. The decoder module typically includes circuitry formed on a printed circuit board located within a housing. Wiring from the decoder module housing must be coupled to the wiring of the wire path as well as coupled to one or more actuator devices each controlling the opening and closing of an irrigation rotor or valve. In one form, the rotor or valve is operated by a solenoid coil as is well known in the art. Likewise, during installation, the operator must provide and electrically connect two separate devices, a decoder module and an actuator coil module, to each other and to the control wire path. FIG. 1 illustrates a separate decoder module 102 and a coil unit 104 that are conventionally coupled together. For example, as illustrated in FIG. 2, for a solenoid activated rotor assembly 200, the coil module 104 is coupled (in part by a bracket 212 and retainer 214) to the parts of a selector valve assembly 202 (including a pressure regulator) attached to a casing assembly 204. The electrical wire inputs to the coil module 104 are then connected to the electrical wire outputs from the decoder module 102, while the electrical wire inputs to the decoder module 102 are coupled to the control wire path from the irrigation controller. Thus, a typical installation requires the connection of six wires to install the decoder module 102 and a coil module 104.

As is well known, in operation, a portion of a plunger (not shown) of the selector valve assembly 202 is disposed within the coil unit 104 while another portion is seated against a solenoid plunge port (not shown) within the selector valve assembly 202 in a normally closed position. In this position, high pressure water flow from a main water control valve (not shown) located within a main control valve portion 206 of the device is flowed up high pressure water line 208 into the selector valve assembly 202 and its regulator and is prevented from further movement by the normally closed position of the plunger against the solenoid port in the selector valve assembly 202. This results in a back pressure that causes the main water control valve to close. In response to signals from the decoder module 102, the coil module 104 causes the actuation of the plunger to move it off of (or unseat from) the solenoid plunge port allowing the high pressure flow in the high pressure line 208 to flow through the selector valve assembly 202 (and its pressure regulator), which relieves the back pressure and allows water to flow through the main control valve and to a pop-up sprinkler device, i.e., the main water control valve is opened. The pop-up sprinkler device is located within the casing assembly 204 and extends upwardly due to the water pressure through a top portion of the casing assembly 204. The high pressure flow exits the selector valve assembly 202 down through a discharge flow line 210 which terminates within the casing assembly 204 at a location downstream of the main water control valve.

SUMMARY OF THE INVENTION

Several embodiments of the invention provide an integrated valve actuator coil and control module for use in irrigation control systems.

In one embodiment, the invention can be characterized as an irrigation control device comprising: a coil adapted to develop an electromagnetic flux sufficient to cause actuation of irrigation equipment; control circuitry to receive a control signals from an irrigation control unit and electrically coupled to the coil to control the flux at the coil; and a housing covering at least a portion of the coil and at least a portion of the control circuitry.

In another embodiment, the invention can be characterized as a method of making an irrigation control device comprising: holding a solenoid assembly with a coil near to control circuitry having circuitry for controlling an electromagnetic flux at the coil; electrically connecting the coil to the control circuitry; placing the solenoid assembly and control circuitry into a housing; securing the solenoid assembly to the housing so that the solenoid assembly is actuated to reciprocate a valve member through an aperture in the housing to selectively engage a valve seat external to the housing; and fixing the control circuitry and coil within the housing.

BRIEF DESCRIPTION OF THE DRAWINGS

The above and other aspects, features and advantages of several embodiments of the present invention will be more apparent from the following more particular description thereof, presented in conjunction with the following drawings.

FIG. 17 illustrates a front elevational view of one embodiment of the control circuitry of the integrated irrigation valve control device of FIG. 10.

FIG. 18 illustrates a rear elevational view of the control circuitry of FIG. 17.

FIG. 22 is a fragmentary, side cross-sectional view of an alternative valve and end structure for the integrated irrigation valve control device of FIG. 10.

Figure 1:
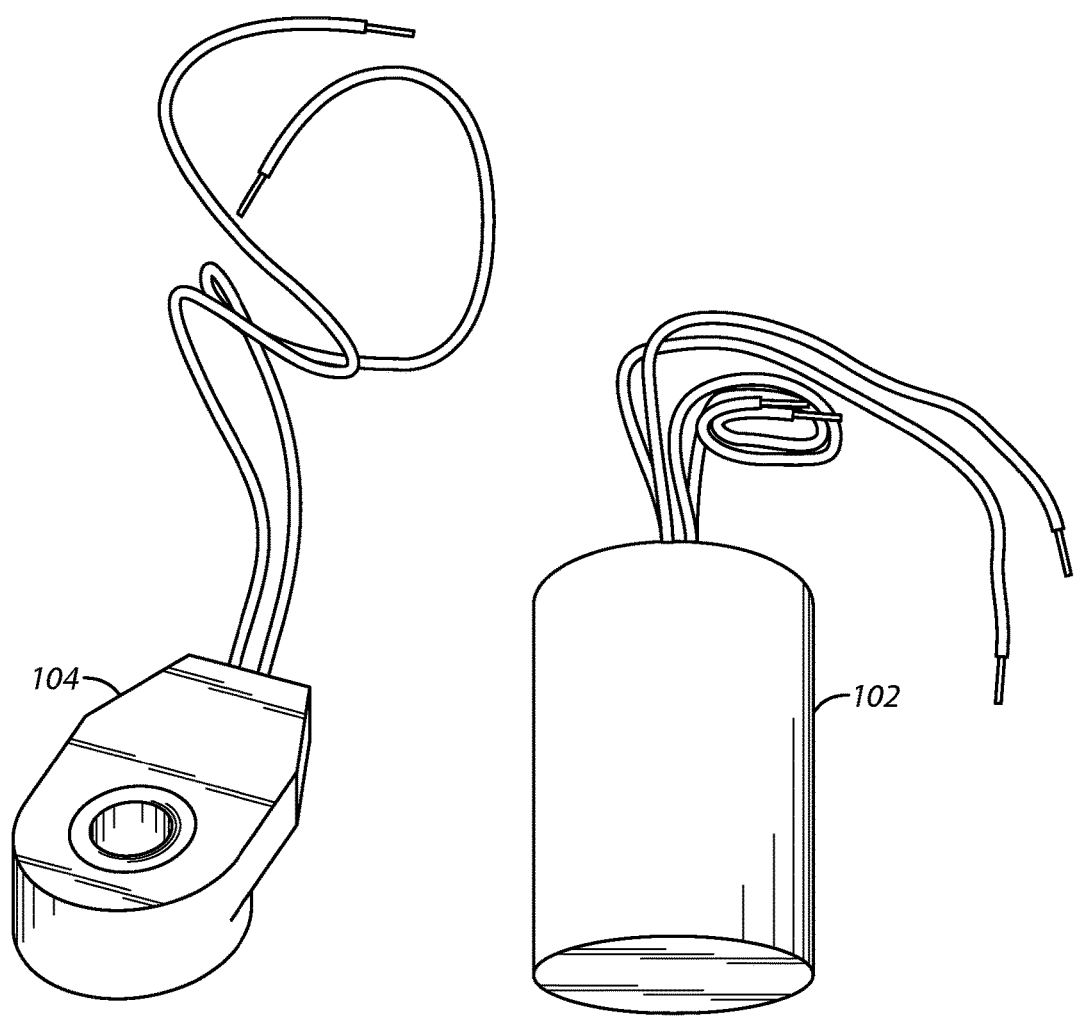
FIG. 1 illustrates a separate sprinkler coil and decoder module for controlling irrigation equipment in a conventional decoder-based irrigation control system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Figure 3:
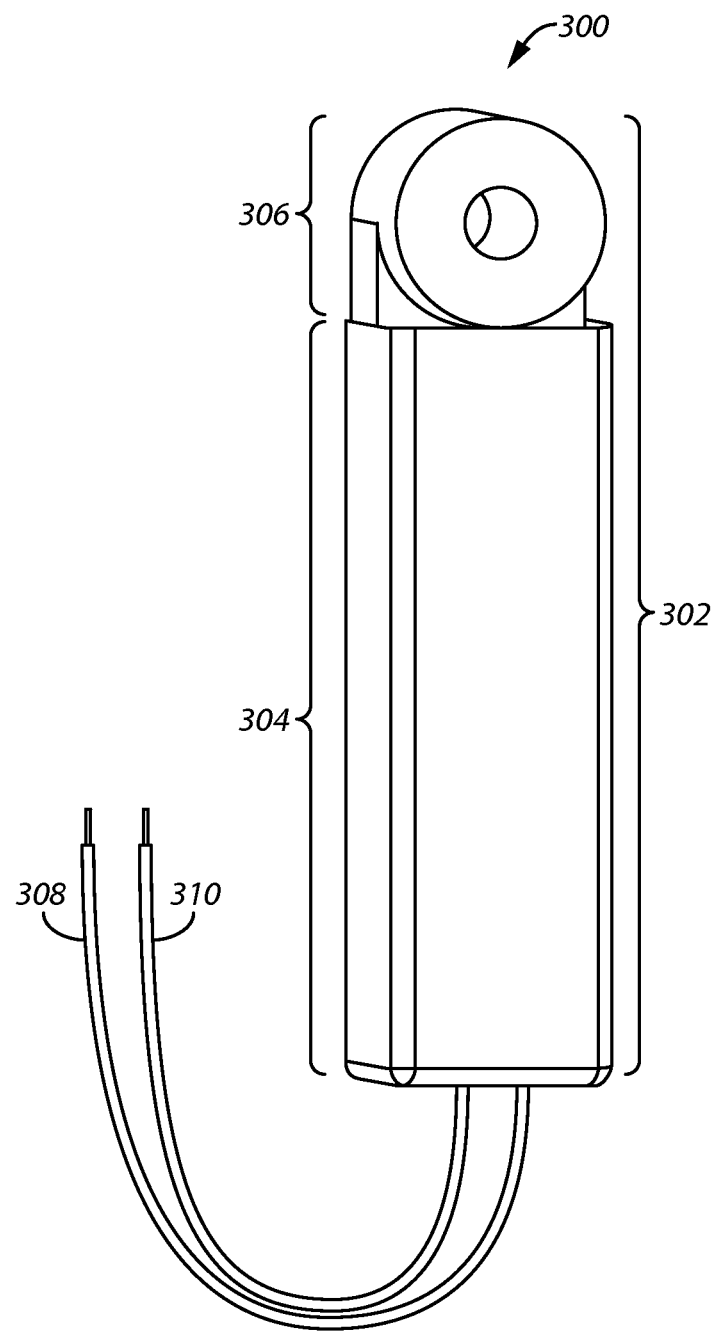
FIG. 3 illustrates an integrated coil and decoder module for use in a decoder-based irrigation control system in accordance with one embodiment of the invention.

Referring first to FIG. 3, a perspective view is shown of an integrated coil and decoder module 300 for use in a decoder-based irrigation control system in accordance with one embodiment of the invention. The integrated coil and decoder module 300 includes a module body 302 (also referred to simply as body 302) including a decoder housing 304 (also referred to as a first housing) and a coil housing 306 (also referred to as a second housing, solenoid housing or coil unit). The module 300 also includes electrical connector wires 308 and 310 (also referred to as electrical connections 308 and 310) extending from the decoder housing 304. The decoder housing 304 includes decoder circuitry (e.g., shown in FIG. 5) and the coil housing 306 includes a wire coil or solenoid (e.g., shown in FIG. 8) formed within. Although the decoder housing 304 and the coil housing 306 are separate functional components, they are integrated together to form a single integrated coil and decoder module 300.

Advantageously, since the module 300 is integrated into a single body 302, an installer need only connect the two electrical connections 308 and 310 to the control wire path of a decoder-based irrigation control system. It is noted that any electrical connections between the decoder circuitry within the decoder housing 304 and the wire coil within the coil housing 306 are already made and sealingly contained within the body 302.

Figure 2:
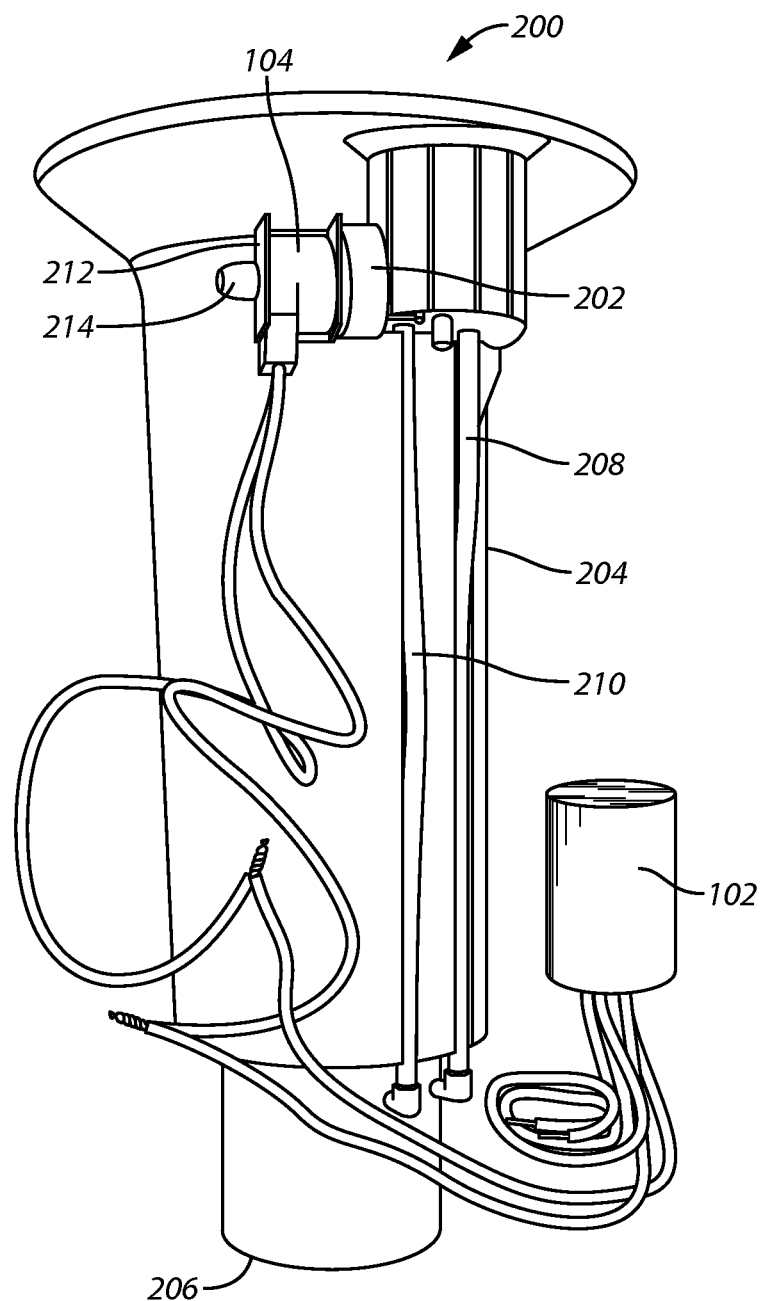
FIG. 2 illustrates a conventional decoder and electric sprinkler application including a separate coil module and decoder module.
Figure 4:
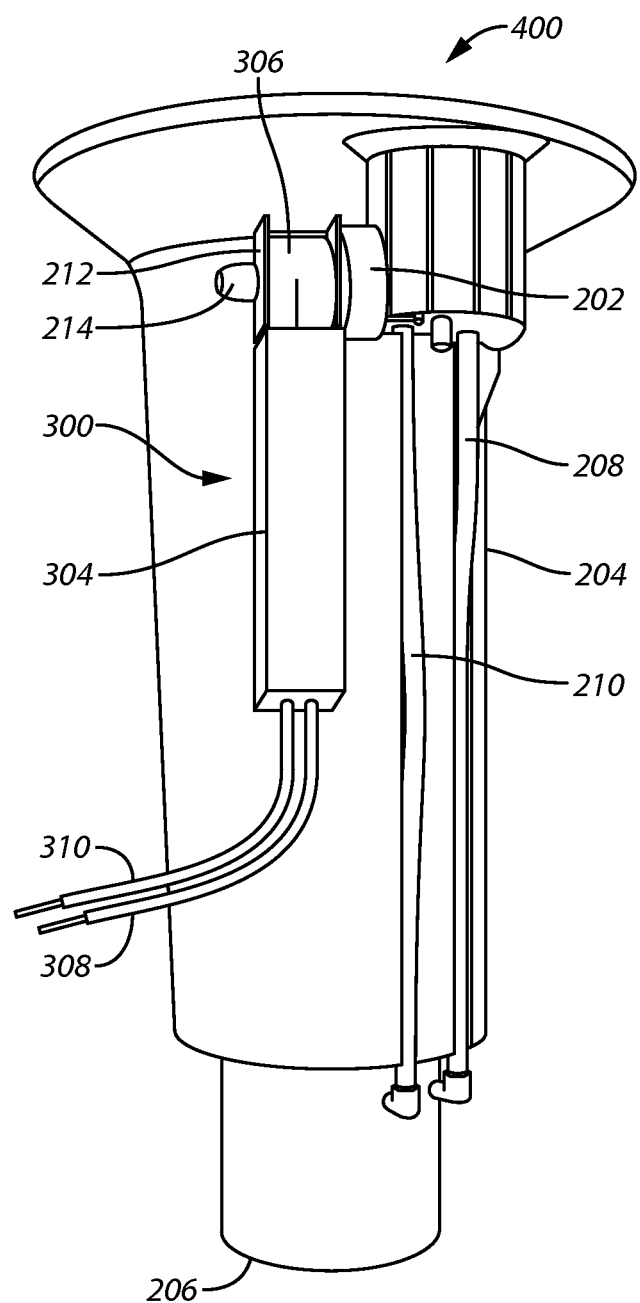
FIG. 4 illustrates a decoder and electric sprinkler application including an integrated coil and decoder module in accordance with several embodiments of the invention.

Referring next to FIG. 4, a perspective view is shown of a decoder and electric sprinkler application including the integrated coil and decoder module 300 of FIG. 3. In this embodiment, in a solenoid activated rotor assembly 400, the coil housing 306 (or solenoid housing) is coupled (in part by the bracket 212 and the retainer 214) to the components of the selector valve assembly 202 attached to the casing assembly 204 (which is typically buried underground or located within a valve box above or below ground). In the illustrated embodiment, the casing assembly 204 contains a pop-up and rotary sprinkler device (not shown). Accordingly, an installation in accordance with this embodiment only involves the connection of two wires (e.g., electrical connections 308 and 310) to install the decoder module 300, as opposed to six wires in the separated decoder module and coil module as illustrated in FIG. 2. Thus, with the new module according to several embodiments of the invention, the task of installing a decoder module and coil unit is simplified since there are fewer wires to connect. Additionally, this embodiment provides a space-saving design that is more streamlined and easier to install with less clutter due to excess wires. Furthermore, the installer only needs to provide and install a single integrated device rather than purchasing and providing a separate decoder module and a separate coil housing module.

In operation, a portion of a plunger (not shown) of the selector valve assembly 202 is disposed within a core tube (not shown) that extends into the opening of the coil housing 306 about which the coil is wound while another portion of the plunger is seated against a solenoid plunge port (not shown) within the selector valve assembly 202 in a normally closed position (e.g., a spring within the core tube holds the plunger against the solenoid plunge port). In this position, high pressure water flow from a main water control valve (not shown) located within a main control valve portion 206 of the device is flowed up high pressure water line 208 into the selector valve assembly 202 and its regulator and is prevented from further movement by the normally closed position of the plunger against the solenoid port in the selector valve assembly 202. This results in a back pressure that causes the main water control valve to close. In response to signals from the decoder housing 304 portion of the integrated coil and decoder module 300, the coil module 306 generates a magnetic field that causes the actuation of the plunger within the core tube to move it off of (or unseat from) the solenoid plunge port allowing the high pressure flow in the high pressure line 208 to flow through the selector valve assembly 202 (and its pressure regulator), which relieves the back pressure and allows water to flow through the main control valve and to a pop-up sprinkler device, i.e., the main water control valve is opened. The high pressure flow exits the selector valve assembly 202 down through a discharge flow line 210 which terminates within the casing assembly 204 at a location downstream of the main water control valve. It is noted that the core tube extends through the bracket 212 and the opening of the coil module 306 such that a portion extends through the back opening of the coil module 306 and back side of the bracket 212. The retainer 214 is preferably a rubber end cap that is positioned over the portion of the core tube extending therethrough to hold the coil module 306 in position against the bracket 212 and the selector valve assembly 202.

Figure 5:
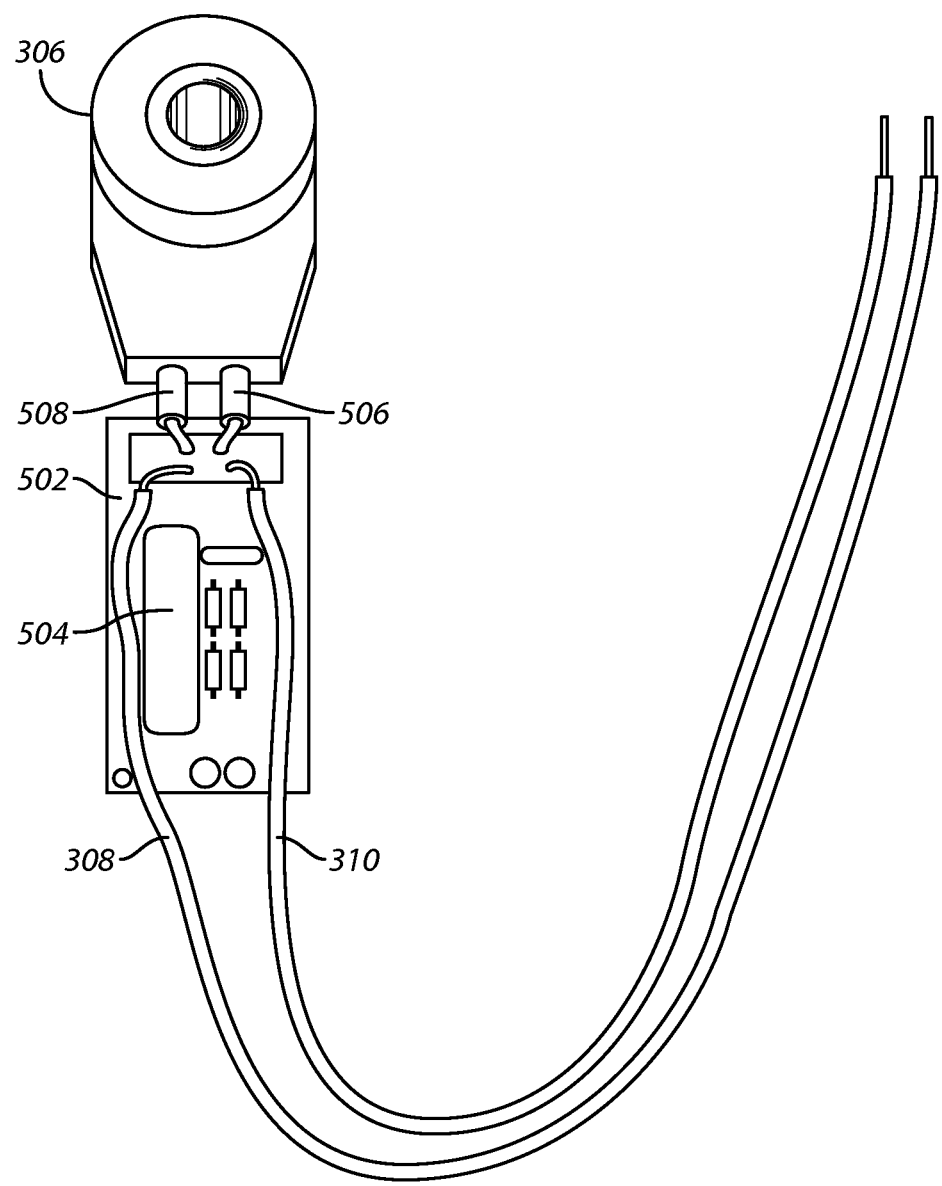
FIG. 5 illustrates decoder circuitry and a coil module of the integrated device of FIG. 3 shown without the decoder housing in accordance with one embodiment of the invention.

Referring next to FIG. 5, a view is shown of the decoder circuitry and coil module of the integrated device of FIG. 3 without the decoder housing in accordance with one embodiment of the invention. Illustrated is a printed circuit board 502 including decoder circuitry 504 formed on or otherwise coupled to or attached to the printed circuit board 502. Also illustrated are the electrical connections 308 and 310 coupled to the decoder circuitry 504 for connection to the control wire path of the decoder-based irrigation control system, as well as electrical connections 506 and 508 extending from the decoder circuitry 504 into the coil housing 306 to electrically couple the decoder circuitry 504 to the wire coil of the coil housing 306. It is noted that the decoder circuitry 504, as well as the coil housing 306 including the coil formed within, are well-known in the art. For example, in one embodiment, the decoder circuitry 504 is found within commercial decoder modules available from the Rain Bird Corp., Glendora, Calif., for example, a single channel, single coil decoder (part number FD-101). Likewise, in one embodiment, the coil housing 306 is commercially available from the Rain Bird Corp., Glendora, Calif., as rotor coil, part number 212165.

In accordance with one embodiment, a commercially available coil housing, such as coil housing 306, is electrically coupled to commercially available decoder circuitry, such as decoder circuitry 504, via electrical connections 506 and 508. Such decoder circuitry includes electrical input connections, such as electrical connections 308 and 310 to be coupled to the control wire path of a decoder-based irrigation control system. The decoder circuitry 504 and coil housing 306 are then inserted into a housing, such as the decoder housing 304, such that the electrical connections 308 and 310 extend through at least one opening formed in the decoder housing 304. Generally, a portion of the coil housing 306 extends into the volume formed within the housing 304, while the portion of the coil housing 306 that is adapted to mate to the selector valve assembly 202 extends out of this volume. Next, a sealant material is filled into the remaining volume within the housing 304 in order to hermetically seal the electronic components within the housing as well as to hermetically and rigidly seal the coil housing 306 to the decoder housing 304. The sealant material may comprise any suitable potting material, such as an epoxy, that is initially in a liquid or fluid state and filled within the volume, and which hardens or cures with time. In other embodiments, other suitable sealants may be applied to the interface between the decoder housing 304 and the coil housing 306 without filling the volume of the decoder housing. Advantageously, the resulting module 300 is an integrated single device in which the decoder circuitry and the coil housing are rigidly fixed to each other and form a single integrated body 302. This embodiment is easy to construct from commercially available components. However, it is noted that in other embodiments, the coil housing 306 and the decoder housing 304 comprise a single housing that is not required to be coupled or otherwise hermetically sealed to each other. Thus, in such embodiments, the wire coil may be directly electrically coupled to the printed circuit board 502 and the decoder circuitry 504 within the same housing. A specific example of such a one-piece housing is illustrated in FIGS. 10-21 and described in detail below.

Figure 6A:
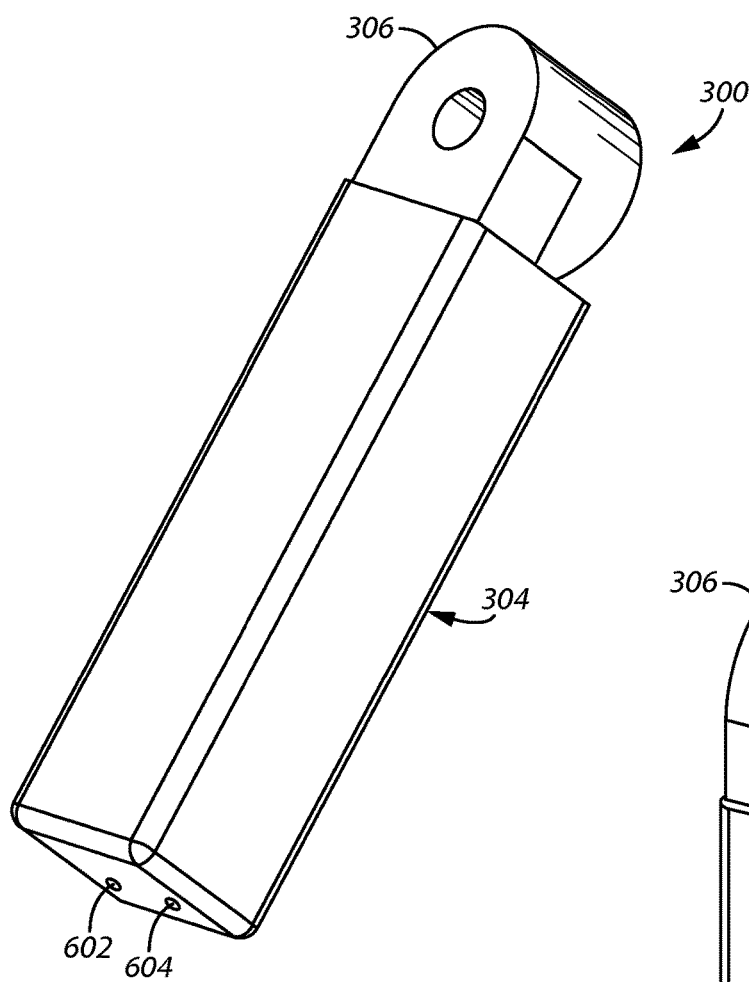
FIGS. 6A and 6B illustrate other views of the integrated coil and decoder module of FIG. 3 in accordance with other embodiments of the invention.
Figure 6B:
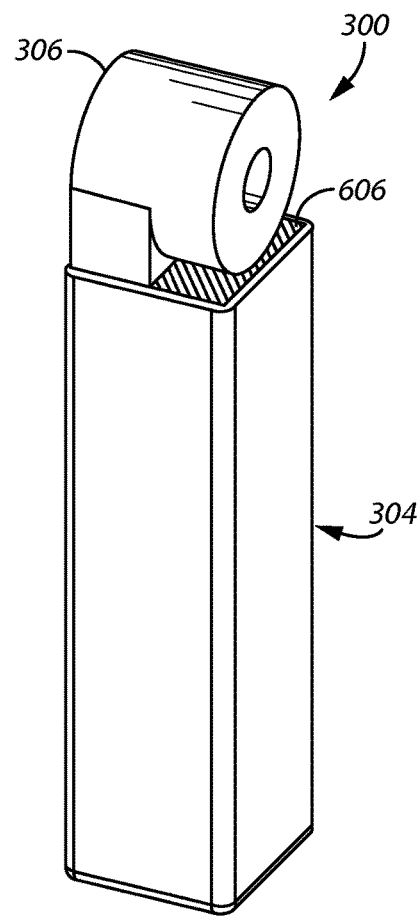

FIG. 6A illustrates a perspective view of the integrated coil and decoder module 300 illustrating one embodiment of connection openings 602 and 604 formed in a bottom wall 704 of the decoder housing 304. In this embodiment, the electrical connections 308 and 310 extend through the openings 602 and 604 as the decoder circuitry 504 is positioned within the housing 304. FIG. 6B illustrates another perspective view of the integrated coil and decoder module 300 illustrating a sealant or potting material 606 filling the interior volume of housing and preventing moisture or other contaminants from entering the housing 304 at the interface between the decoder housing 304 and the coil housing 306 and at the openings 602 and 604. It is noted that in other embodiments, a single opening (as opposed to the two openings 602 and 604), is formed in the decoder housing 304 that any electrical connections extend through, while a suitable sealant or potting material seals the opening.

Figure 7:
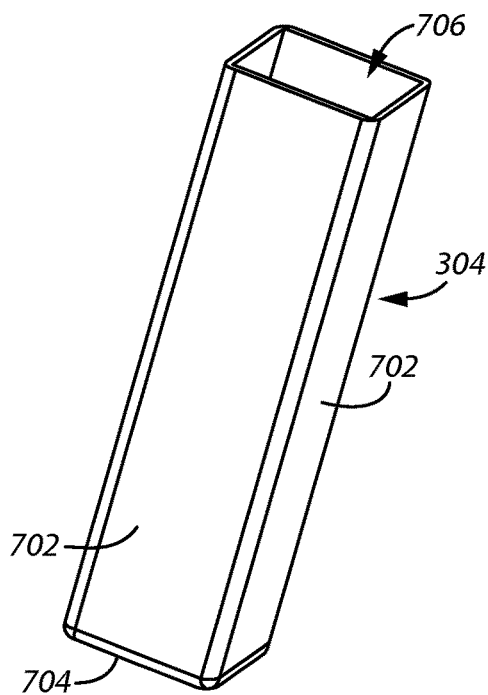
FIG. 7 illustrates the decoder housing of one embodiment of the device of FIG. 3.

Referring next to FIG. 7, a perspective view is shown of the decoder housing 304 of the device of FIG. 3. As illustrated, in preferred form the decoder housing 304 has an elongated rectangular parallelepiped geometry formed by side walls 702 and a bottom wall 704. A top end of the housing 304 is open illustrating a volume 706 formed within and for receiving the decoder circuitry and in some embodiments, at least a portion of the coil housing 306. It is noted that the shape of the decoder housing 304 may take many forms other than that illustrated.

Figure 8:
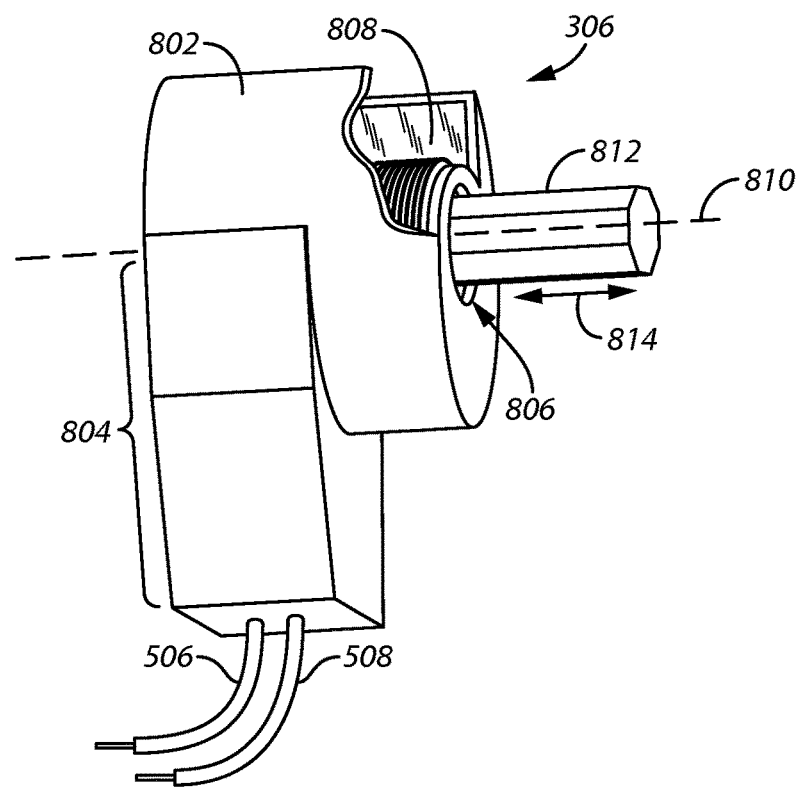
FIG. 8 illustrates a coil housing of one embodiment of the device of FIG. 3 with a partial cutaway showing a wire coil.

Referring next to FIG. 8, a perspective view is shown of the coil housing 306 of the device of FIG. 3 with a partial cutaway view to show the wire coil. The coil housing 306 includes a coil portion 802 (or solenoid portion) and a neck portion 804. In preferred form, a portion of the neck portion 804 extends into the volume 706 formed in the decoder housing 304. However, in other embodiments, coil housing 306 does not extend into the volume but nevertheless is rigidly and sealingly coupled to the decoder housing 306. The coil portion 802 is preferably cylindrically shaped and formed about an opening 806. Thus, the coil portion 802 has an outer cylindrical periphery and an inner concentric cylindrical periphery. The coil portion 802 contains a wire coil 808 or solenoid (shown in the partial cutaway view of FIG. 8) wrapping about the inner periphery and sealingly contained within the walls of the coil portion 802. As is well known in the art, the wire coil 808 wraps about the inner periphery in a coil shape. Upon the application of an electrical current through the wire coil 808, an electromagnetic flux is formed in the opening 806 of the coil portion 802 about a central axis 810 extending through the opening 806. This flux is used to actuate a component 812 or device (such as a plunger) typically moveable along the central axis 810 (e.g., along the path of arrow 814) within the opening 806 of the coil portion 802 in order to cause the opening or closing of a solenoid actuated irrigation valve (e.g., in one embodiment, by opening a valve of a selector valve assembly 202 controlling the solenoid actuate irrigation valve). In preferred form, the component 812 does not contact the inner surfaces of the coil portion 802 in the opening 806 and is metallic and/or magnetic in order to respond to the generated electromagnetic flux. In one example, the component 812 is a plunger contained within a core tube (not shown) that extends through the opening 806 and is coupled to a selector valve assembly (such as selector valve assembly 202 of FIG. 4). The plunger is held in a normally closed position within the core tube by a spring also within the core tube. Upon the application of current to the wire coil 808, the plunger is caused to move within the core tube relative to the coil housing 306 (and wire coil 808) and the core tube to open the selector valve assembly as described above. One end of the core tube extends through the opening 806 to allow a retainer (such as retainer 214) to help hold the coil module or housing 306 in position about the core tube and the selector valve assembly. Such coil housings 306 including the wire coil 806, as well as core tube and plunger assemblies are well-known in the art.

Figure 9:
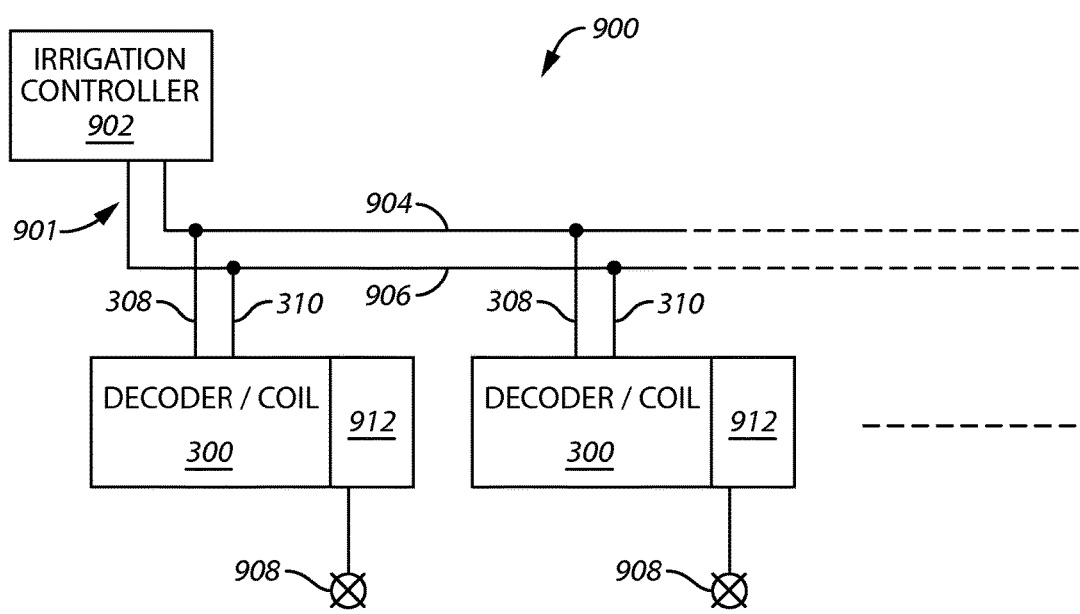
FIG. 9 is a diagram of a decoder-based irrigation control system including multiple integrated coil and decoder modules according to several embodiments of the invention.

Referring next to FIG. 9, one embodiment is shown of a decoder-based irrigation control system 900 including several integrated coil and decoder modules 300 according to several embodiments of the invention. An irrigation controller 902 provides a control wire path 901 extending from the controller 902 into a geographic region where irrigation is desired. The control wire path 901 is typically buried underground. It is understood that multiple separate control wire paths may be output from the controller 902; however, for purposes of illustration, only a single control wire path 901 is shown. Typically, the control wire path 901 includes two wires, a power wire 904 and a common wire 906. In other embodiments, the control wire path 901 has three wires as is well known in the art. Thus, the control wire path 901 may also be referred to as a multi-wire path. A power signal, e.g., 24 volts AC, from the controller 902 is sent on the power line 904 to any connected devices while the common line provides a return to complete the circuit. Generally, the power signal is of sufficient voltage to cause a magnetic flux in the coil housing to open a solenoid activated valve 908. In other words, the electromagnetic flux is sufficient to control irrigation equipment. In a decoder-based system, the power signal is modulated or encoded with data that is readable by the decoder circuitry as is known in the art so that the controller 902 can control multiple irrigation valves using the single control wire path 901.

At various locations in the field, an integrated coil and decoder module 300 according to several embodiments of the invention is directly coupled to the control wire path 901. For example, at various locations in the field, the electrical connections 308 and 310 are coupled to the power line 904 and the common line 906. In one embodiment, the lines and connections are respectively coupled together using a twist-on wire connector and silicon grease to provide water resistant electrical connections. The decoder portion of the integrated coil and decoder module 300 decodes the modulated or encoded power signal on the power line 904 and determines whether or not to provide the power signal (electrical current) to the wire coil of the integrated coil and decoder module 300 (e.g., via electrical connections 506 and 508).

As described above, the wire coil generates a magnetic flux sufficient to cause device of an actuator or solenoid assembly 912 (e.g., in one embodiment, to actuate a plunger of a selector valve assembly 202) to open a normally closed solenoid operated valve 908 (e.g., in one embodiment, a main control valve of a main control valve portion 206), which is coupled to a water supply line on one end and to one or more sprinkler devices on the other end. It is noted that in embodiments implemented in a solenoid activated rotor assembly for a pop-up sprinkler device, that a given integrated coil and decoder module couples to a solenoid operated valve 908 that couples to a single sprinkler device; however, that in other embodiments, the solenoid activate valve 908 may be coupled to multiple sprinkler devices. It is further noted that generally, a sprinkler device may be any rotor device, stationary device, drip device, etc. As is known, there may be multiple integrated coil and decoder modules 300 coupled to the control wire path 901 at various locations, for example, tens or hundreds of modules 300 coupled to the control wire path 901. Advantageously, according to several embodiments of the invention, by providing integrated coil and decoder modules 300 instead of separate decoder modules and coil units that must be coupled to each other and to the control wire path, the installation process has been simplified by reducing the number of wires than an installer must connect and by providing a more streamlined design at the casing assembly 204. Additionally, the decoder circuitry and the coil housing form a single rigid and integrated body.

Figure 19:
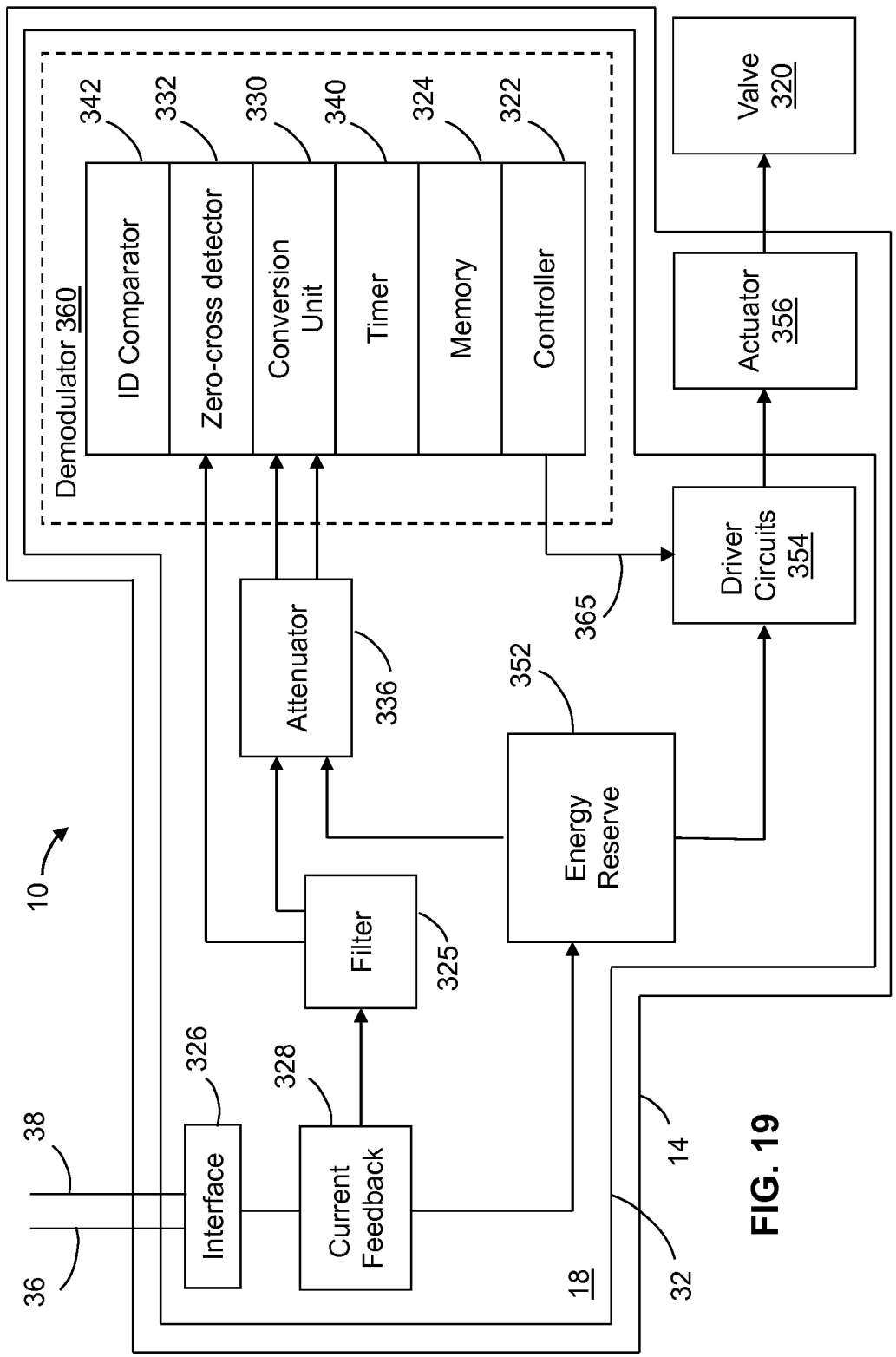
FIG. 19 is a functional block diagram of one embodiment of the control circuitry shown in FIGS. 17-18.
Figure 20:
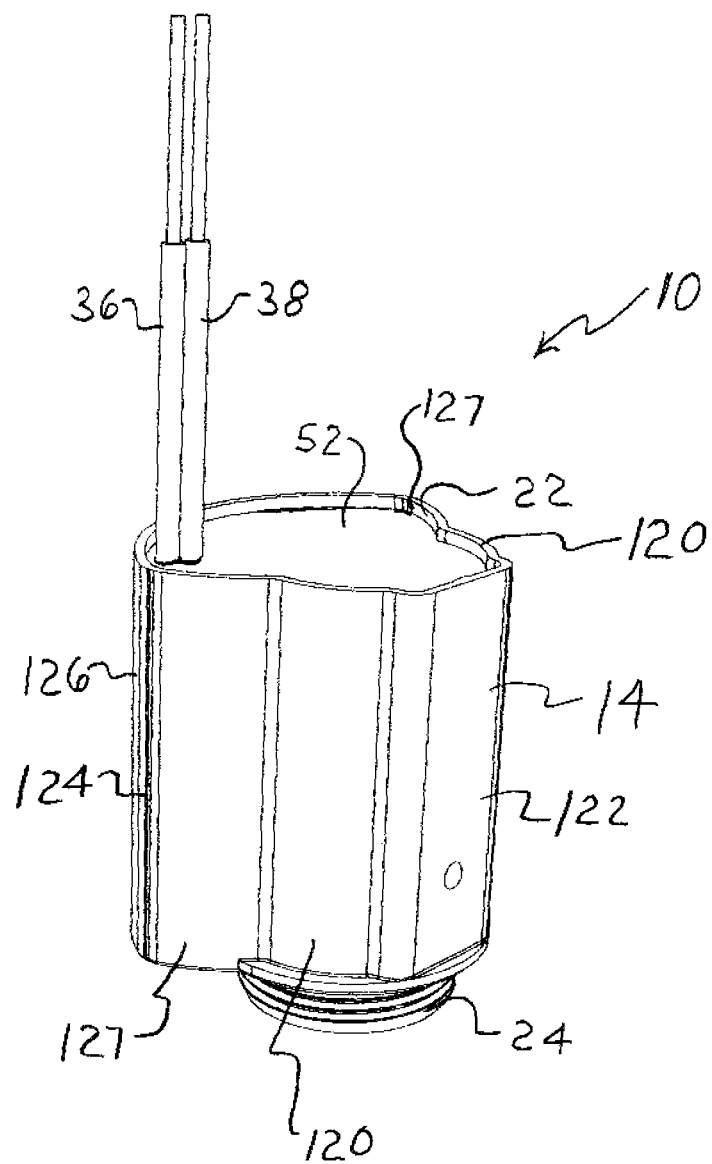
FIG. 20 is an upper and right side perspective view of the integrated irrigation valve control device of FIG. 10 prior to installation in accordance with one embodiment.
Figure 21:
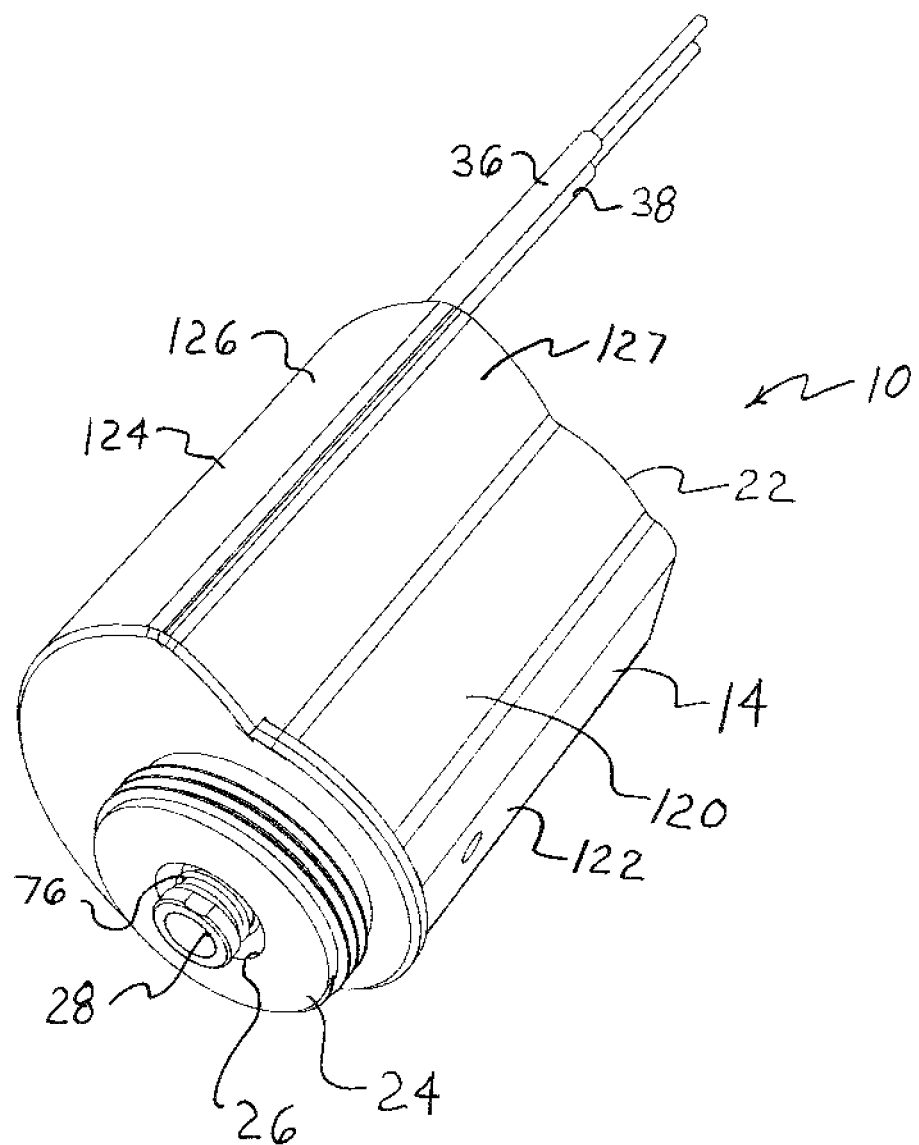
FIG. 21 is a lower and right side perspective view of the integrated irrigation valve control device of FIG. 10 prior to installation in accordance with one embodiment.

Referring to FIGS. 10-21, in an alternative form, in accordance with one or more additional embodiments, an integrated irrigation valve control device 10 (also referred to as an integrated valve control device, a valve control device or an integrated control device) is mounted on irrigation equipment 12 such as a sprinkler assembly or a solenoid activated rotor assembly that operates similarly to the rotor assembly 400 described above. Thus, the integrated control device 10 attaches to a solenoid port or selector assembly 202 that has a solenoid valve seat as with rotor assembly 400. In this case, however, the solenoid port 202 has interior threads for receiving a threaded end 24 of the integrated control device 10 as described in detail below. FIGS. 20 and 21 provide perspective views of the integrated valve control device 10 prior to installation or mounting to the irrigation equipment 12.

In this example, integrated control device 10 has a housing 14 for covering at least a portion of a coil 16 and at least a portion of control circuitry 18 (which may also be referred to as a device controller or control electronics). In one form, the housing 14 is integrally formed as one-piece such as by plastic molding although the housing could be made of multiple pieces and made of other non-plastic material. The coil 16 is part of a solenoid assembly 20 such as a Rain Bird latching solenoid and develops an electromagnetic flux sufficient to cause actuation of a valve portion of the rotor assembly 12 by opening and closing a solenoid port as described above for the irrigation module 300 and sprinkler assembly 400.

The housing 14 has an open end 22 and an opposite threaded end 24 for securing the housing onto the solenoid port 202 of the sprinkler assembly 12. The threaded end 24 has an aperture 26 so that a valve member or plunger 28 of the solenoid assembly 20 can reciprocate through the aperture 26 to selectively engage a valve seat and open and close the solenoid port 202 that is disposed externally to the housing 14.

The control circuitry 18 receives operational power and control signals from an irrigation controller or other irrigation control unit or interface unit coupled to an irrigation controller, as described above, and is electrically coupled to the coil 16 to control the flux at the coil 16. In one form, the control circuitry 18 includes a circuit board 32 with electronic components 34 mounted on the board. The control circuitry 18 also has at least one, but here two input control wires 36 and 38 that may also provide operational power, similar to wires 308 and 310. In other embodiments with a three wire control path, there are three control wires. The wires 36 and 38 extend from the board 32 and out of the open end 22 of the housing 14 for connection to a control wire path of the irrigation control unit or system. In this form then, the input control connection 40 where the circuit board 32 connects to the wires 36 and 38 remains within the housing 14. This may be true no matter the form of the input transmitter whether by more or less wires than wires 36 and 38, or whether by wireless receiver or other input device connected to the circuit board 32. Thus, in the illustrated example, the only parts extending out of the housing 14 are the two wires 36 and 38, and the plunger 28. Otherwise, the housing 14 is sized to cover the entire circuit board 32 and the entire coil 16.

It will be appreciated, however, that a housing may be provided to cover only parts of both structures such that either a portion of the coil or a portion of the control circuitry extends out of the housing when access to either portion is a priority, for example. In either case, in the illustrated example, any electrical connection between the coil 16 and the control circuitry 18 remains within housing 14 as described in greater detail below. Thus, this configuration eliminates the time and cost of labor for connecting a solenoid coil to the control circuitry in the field for potentially hundreds of sprinkler assemblies at a single irrigation system site.

In one form, the solenoid assembly 20 with the coil 16 and the control circuitry 18 are initially placed within housing 14 without any separation structure between them. Once placed, the housing 14 is filled with a curable, non-conductive potting material 52, including between the control circuitry 18 and the coil 16, that hardens to rigidly hold the control circuitry 18 spaced from the coil 16 to reduce the chances of a short circuit.

In the illustrated alternative embodiment, however, the integrated valve control device 10 also has a spacer 50 disposed between the control circuitry 18 and the coil 16 to maintain the coil at a predetermined position relative to the control circuitry 18. Specifically, the spacer 50 is positioned to prevent a short circuit caused by the coil 16 or metal components on the solenoid assembly 20 coming into contact with the electronics on the circuit board 32. Thus, the spacer 50 at least maintains the coil 16 spaced from the circuit board 32. The coil 16 may sit loosely on the spacer 50 until a curable, insulating sealant or potting material 52 is poured into the housing 14 and solidifies the position of each of the components within the housing. The spacer 50 also is made of a non-electrically conductive material such as plastic to further insulate the coil 16 from the circuit board 32. As explained below, the spacer 50 also may be used to secure the coil 16 relative to the circuit board 32 in at least one other direction (e.g., longitudinally, laterally).

In more detail, the solenoid assembly 20 includes a bobbin 42 supporting the coil 16. The bobbin 42 has an annular core 44 and two flanges 46 and 48 extending radially outward from the core 44 with the coil 16 mounted between the flanges. The flanges also extend radially outward past the coil 16. A metal, U-shaped bracket or yoke 54 extends around the bobbin and has a lower flange or end 60 and an upper flange or end 61 (herein the words upper and lower are used merely to describe internal relation of parts and do not necessarily reflect an orientation of the device 10). The upper end abuts a raised portion 47 of the upper flange 46 of the bobbin 42. An annular magnet 56 and washer 58 are attached to the lower end 60 of the bracket 54.

A core tube 62 is inserted through the aperture 26, the bobbin 42, and the bracket 54. The core tube 62 has a widened end 64 that extends radially over a ledge 66 formed within aperture 26 so that the ledge 66 retains the widened end 64 in the aperture 26. An opposite end 68 of the core tube 62 extends through the bracket 54 to be engaged with a jam nut 70 above the bracket 54. An O-ring 72 is disposed between the ledge 66 and the widened end 64. With this configuration, the solenoid assembly is secured to the housing 14 by tightening the jam nut 70.

The widened end 64 of the core tube 62 has a cavity 74 for loosely receiving the plunger 28. The plunger 28 is metal so that the magnet 56 maintains the plunger in the core tube 62. By applying a pulse of flux to the coil 16, the plunger may be moved to an open or closed position. A biasing member or spring 76 mounted on the plunger 28 compresses against the core tube 62 while the plunger 28 is in a retracted open position (away from an external valve seat and solenoid port). This reduces the force necessary to advance the plunger 28 to the closed position where the plunger 28 extends out of, or extends farther out of, the end 24 of the housing 14 for engagement with the external valve seat.

In the illustrated form, all of the parts of the solenoid assembly 20 mentioned above except for the plunger 28 are maintained within the housing 14. It will be understood, however, that many variations are contemplated where some of the parts mentioned may be placed or extend externally of the housing 14, such as core tube 62.

Referring to FIG. 22, instead, other external parts of the irrigation equipment may be placed within the housing 14 as part of the integrated control device 10, such as the solenoid port and valve seat that the plunger engages. For example, an alternative valve end structure 160 may be placed within an end cavity 162 formed on threaded end 24 in accordance with another embodiment. Such an end structure 160 includes a valve seat member 164 with a discharge fluid passage 166 with an opening 174 that is closed by axial engagement with the plunger 28. A filter 168 is placed around the exterior of the valve seat member 164 to filter fluid flowing to a side inlet passage 170 formed on the valve seat member 164. In the example form, the filter 168 may be snap-fit or otherwise secured to the threaded end 24 to hold the valve seat member 164 in place on the housing 14. With this structure, fluid flows through the inlet fluid passage 170, into aperture 26, and is either blocked or permitted to flow out the discharge fluid passage 166 depending on whether the plunger 28 covers the opening 174 to the discharge fluid passage 166.

Figure 12:
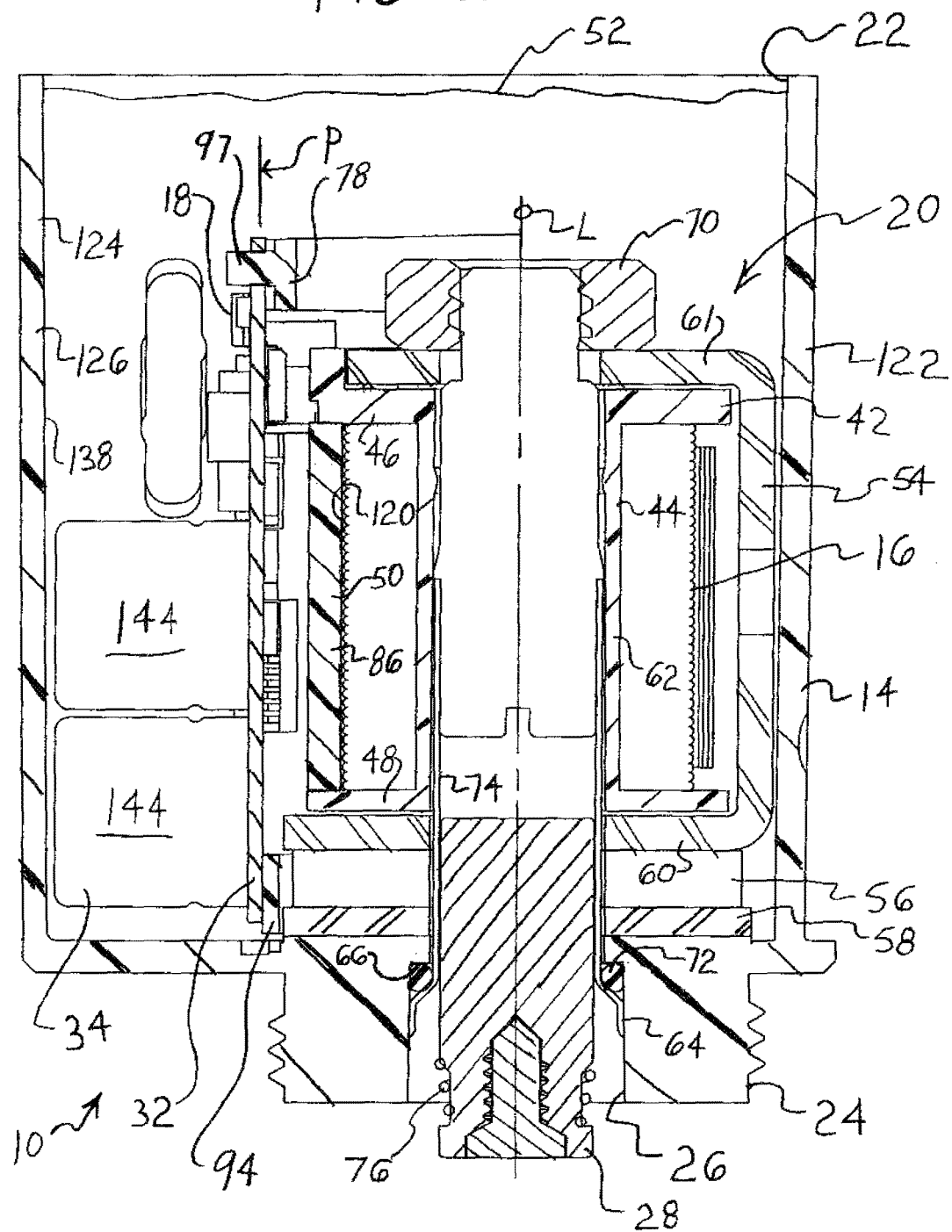
FIG. 12 illustrates a cross-sectional right side view of one embodiment of the integrated irrigation valve control device of FIG. 10.
Figure 13:
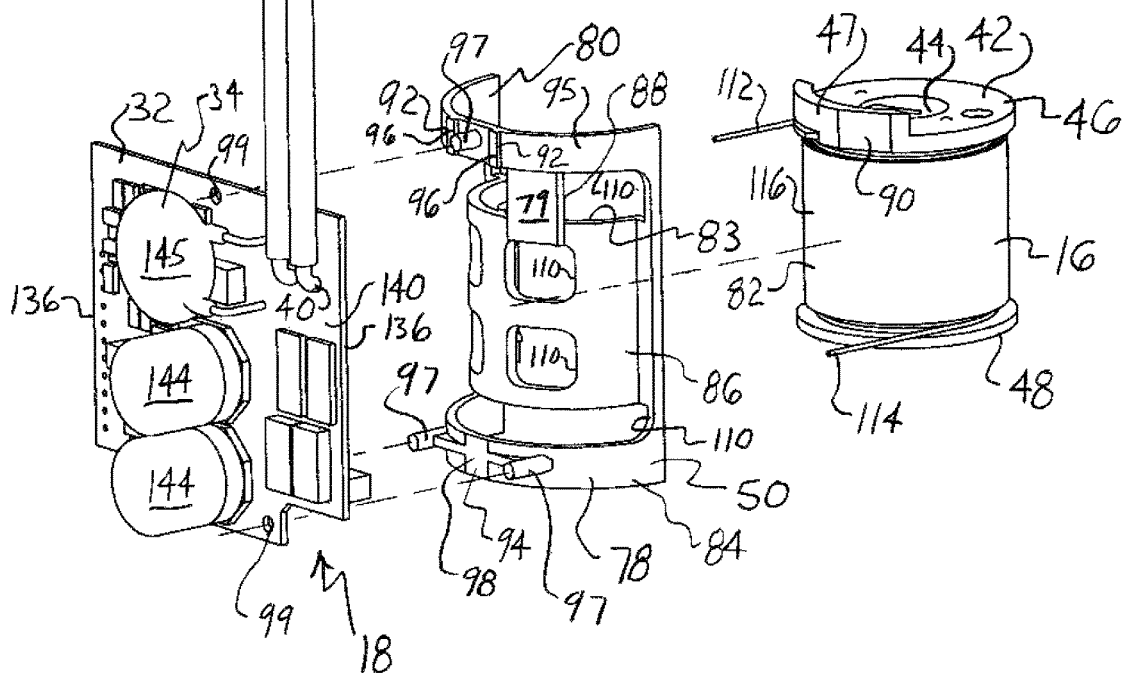
FIG. 13 illustrates an exploded front perspective view of one embodiment of control circuitry, spacer, and solenoid coil of the integrated irrigation valve control device of FIG. 10.
Figure 14:
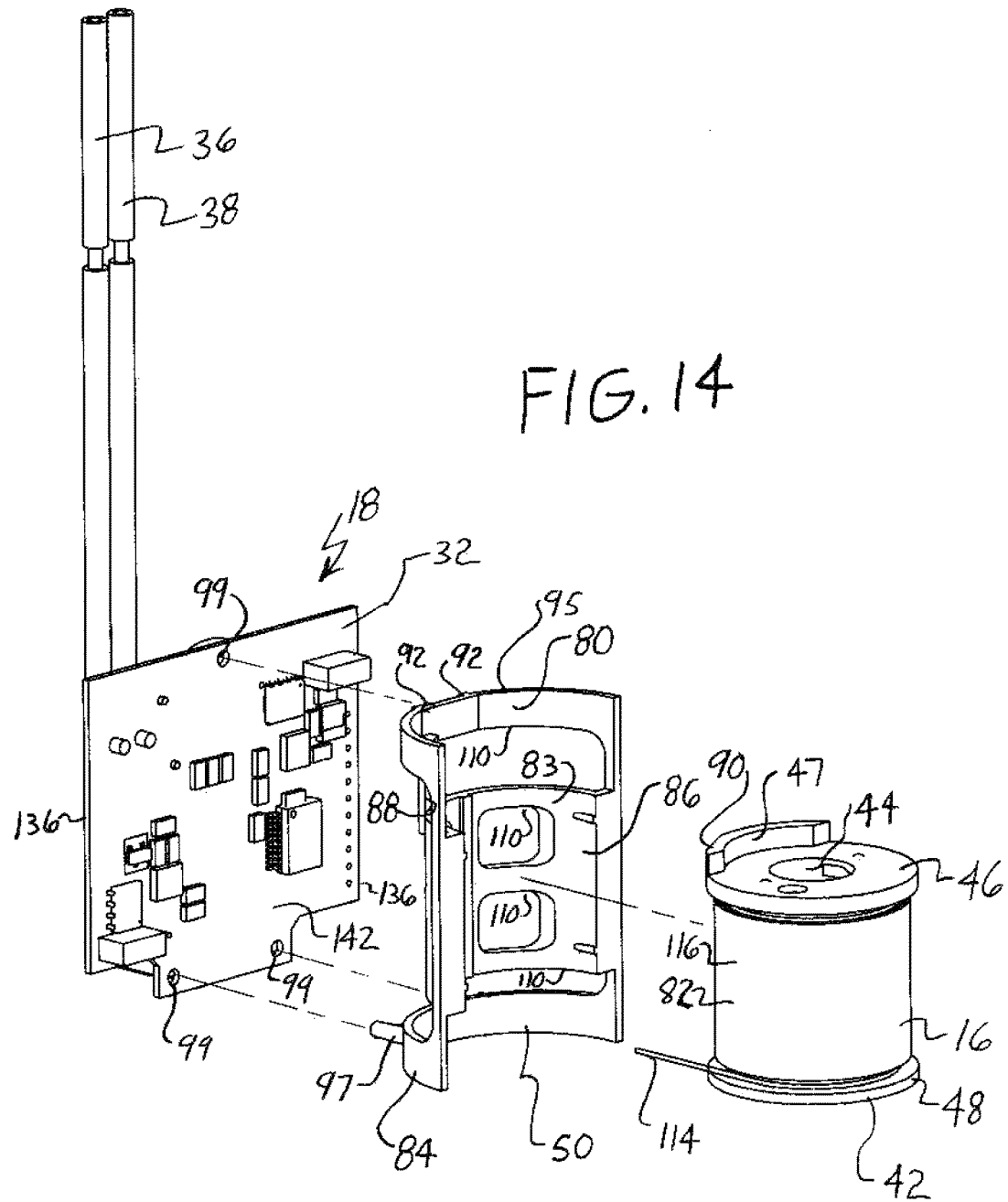
FIG. 14 illustrates an exploded rear perspective view of one embodiment of control circuitry, spacer, and solenoid coil of the integrated irrigation valve control device of FIG. 10.

Referring to FIGS. 12-14, the spacer 50 has a main, generally flat member 78 that is aligned with the coil 16. Specifically, the main member 78 has a first side 80 facing the coil and that is curved generally about a longitudinal axis L of the coil 16 to match the cylindrical, outer surface or curvature 82 of the coil 16. In the illustrated form, the entire member 78 is curved rather than just the first side 80. So shaped, first side 80 forms a recess 83 for receiving the coil 16. The first side 80 extends around the coil 60 sufficient to limit motion of the coil 16 relative to the spacer 50 and circuit board 32 in a lateral direction (perpendicular to the axis L and parallel to a plane P generally defined by the circuit board 32).

The main member 78 also includes an outer frame portion 84 and a projecting portion 86 that, in one example, spans the frame portion 84 and projects radially inward from the frame 84 to extend directly between the flanges 46 and 48 of the bobbin 42. The projecting portion 86 has a longitudinal height that approximately matches the distance between the flanges 46 and 48 to retain the solenoid assembly, relative to the spacer 50 and circuit board 32, in a longitudinal direction (parallel to the axis L of the coil 16) and parallel to the plane P of the circuit board 32.

The main member 78 also has a flat surface 88 to engage a flat surface 90 on the bobbin 42 to limit rotation of the solenoid assembly 20 and coil 16 relative to the spacer 50 and circuit board 32. In one embodiment, the flat surface 88 is formed on a plate portion 79 spanning from the projecting portion 86 to the frame portion 84.

The spacer 50 also has at least one stand, here two upper stands 92 and a lower stand 94 extending toward the circuit board 32 from a second side 95 of the main member 86 opposite the first side 80. Two laterally spaced stands 92 extend from an upper part of the frame portion 84 and have a flat surface 96 elongate in a longitudinal direction for lying flush on the circuit board 32. The stand 94 extends from a lower part of the frame portion 84 and has a plus-shaped flat surface 98 for contacting the circuit board 32. These stands 92 and 94 assist in maintaining at least some distance between the coil 16 and the circuit board 32, and since the second side 95 of the main member 78 is convex, the stands 92 and 94 also limit rolling of the spacer 50 relative to the circuit board 32.

Pins 97 also extend from the second side 95 of the spacer 50 for insertion into holes 99 on the circuit board 32 to secure the spacer 50, and in turn the coil 16, laterally and longitudinally (or all directions parallel to the plane P) relative to the circuit board 32.

As mentioned above, once the control circuitry 18, spacer 50, and coil 16 are disposed within the housing 16, the housing is filled with the potting material 52 at least between the control circuitry 18 and the coil 16. In one form the potting material 52 fills a sufficient amount of the housing 16 to substantially hold the components in fixed positions relative to each other and within the housing 16, and can even be described as fixing the components to each other. For example, in the illustrated form, the coil 16 is loosely placed against the spacer 50. Thus, while the main member 78 may secure the coil 16 laterally, longitudinally, and rotationally relative to the spacer 50, the coil 16 can easily be moved laterally away (in a direction perpendicular to plane P) from the spacer 50 and circuit board 32. however, once the potting material 52 fills the voids around the coil 16 and spacer 50, the coil 16 will also be substantially secured to the spacer 50 in at least one direction, and here laterally toward the circuit board 32 and spacer 50. To permit the potting material 52 access to the voids around the spacer 50, the spacer 50 has at least one through hole 110 to receive the potting material 52 so that a bridge of potting material can extend from the first side 80 to the second side 95 of the main member 78. The ends 112 and 114 of the coil 16 may also extend through the through-holes 110 to connect to the circuit board 32 at connections 118.

With this configuration, the control circuitry 18 and solenoid assembly 20 and/or coil 16 occupy the same volume such that, at least along the side of the coil facing the control circuitry 18 or circuit board 32, only the spacer 50 and potting material 52 are placed directly between the control circuitry 18 and the coil 16. It will be understood that the term coil here includes any tape or wrapping that remains around the coil to holds the coil wires in place.

In some embodiments, the potting material 52 has a coefficient of thermal expansion such that the electronic components 34 on the circuit board 32 are not substantially affected by the expansion and contraction of the potting material 52 as temperature changes. The potting material 52 will also seal the housing from moisture and other contaminants as mentioned above. One example of such a potting material is a two-part epoxy made by Epoxy Formulations, Inc.

Referring to FIG. 12, the housing 14 is made as small as possible to reduce the likelihood of damaging the integrated control device 10 and to make the integrated control device 10 more adaptable for attachment to a variety of irrigation equipment. More specifically, in order to make the height (or longitudinal length parallel to axis L) of the housing 14 as short as possible, the control circuitry 18, or more specifically the circuit board 32, is placed along a side 116 of the coil 16 so that the longitudinal lengths of the coil 16 and control circuitry 18, and spacer 50 if present, all overlap. In one form, the circuit board 32 is approximately the same longitudinal length as the spacer 50, and the total longitudinal length of the circuit board 32 is no more than approximately twice the longitudinal length of the coil 16. A shorter housing will reduce the chances that the integrated control device 10 is unintentionally impacted by a shovel while the irrigation device upon which it is attached is placed into or dug up from the ground. The reduced size will also reduce compaction and expansion stresses caused by freeze/thaw cycles in cold weather climates.

Optionally, it will be understood that while the circuit board 32 is placed along a side 116 of the coil 16 so that the circuit board 32 extends parallel to axis L of the coil, the circuit board 32 could alternatively be placed to extend transverse to axis L over the upper end 61 of the bracket 54. In this case, if a spacer is provided, it could engage the upper end 61 of the bracket 54.

As yet another option, an interior side of the housing 14 may have separately attached or integrally formed hangers or slots to hold the circuit board 32 in a position spaced away from the solenoid assembly 20.

Referring to FIGS. 15-16 and 20-21, the housing 14 also is sized and shaped so that the entire housing 14 can be rotated for threaded attachment to irrigation equipment of various sizes without impacting structure on the irrigation equipment. To accomplish this, the housing 14 has one wall 120 generally extending around the coil 16 and generally corresponding to the curvature of the coil 16 with its center of curvature being at axis L. The wall 120 includes one flat mid section 122 extending around the bracket 54.

The housing 14 also has a radially expanded portion 124 for extending around the control circuitry 18. The expanded portion 124 includes a curved outer wall 126 extending over the control circuitry 18 and specifically facing the circuit board 32. The outer wall 126 is connected to the wall 120 by connecting walls 127. Since the outer wall 126 is the part of the housing 14 that extends radially outward the farthest, the outer wall 126 has a radius selected so that the outer wall avoids contact with structure on irrigation equipment while the housing 14 is being attached to the irrigation equipment. For example, the outer wall 126 may have a radius R of approximately 1.07 inches or less so that in addition to the sprinkler rotor assembly 12, the integrated control device 10 may be threaded onto a Rain Bird irrigation valve 128 where the distance D from the center of the solenoid port 130 on the valve to an edge 132 of a handle 134 on the valve is only 1.09 inches as shown on FIG. 16. It is understood that this dimension may be varied and can depend on the implementation. In some embodiments, the distance D is designed to be less than 2 inches, in other embodiments, less than 1.5 inches, in other embodiments, less than 1.1 inches and in other embodiments, less than 1.0 inches. In the illustrated form, the outer wall 126 has a substantially constant radius although this need not always be the case. Also, the outer wall 126 does not necessarily have its center of curvature at axis L of the coil 16.

Since the expanded portion 124 extends radially farther than the remainder of the housing 14, the device 10 rotates about axis L eccentrically like a cam while the integrated control device 10 is threaded to the irrigation equipment 12 or 128.

Figure 15:
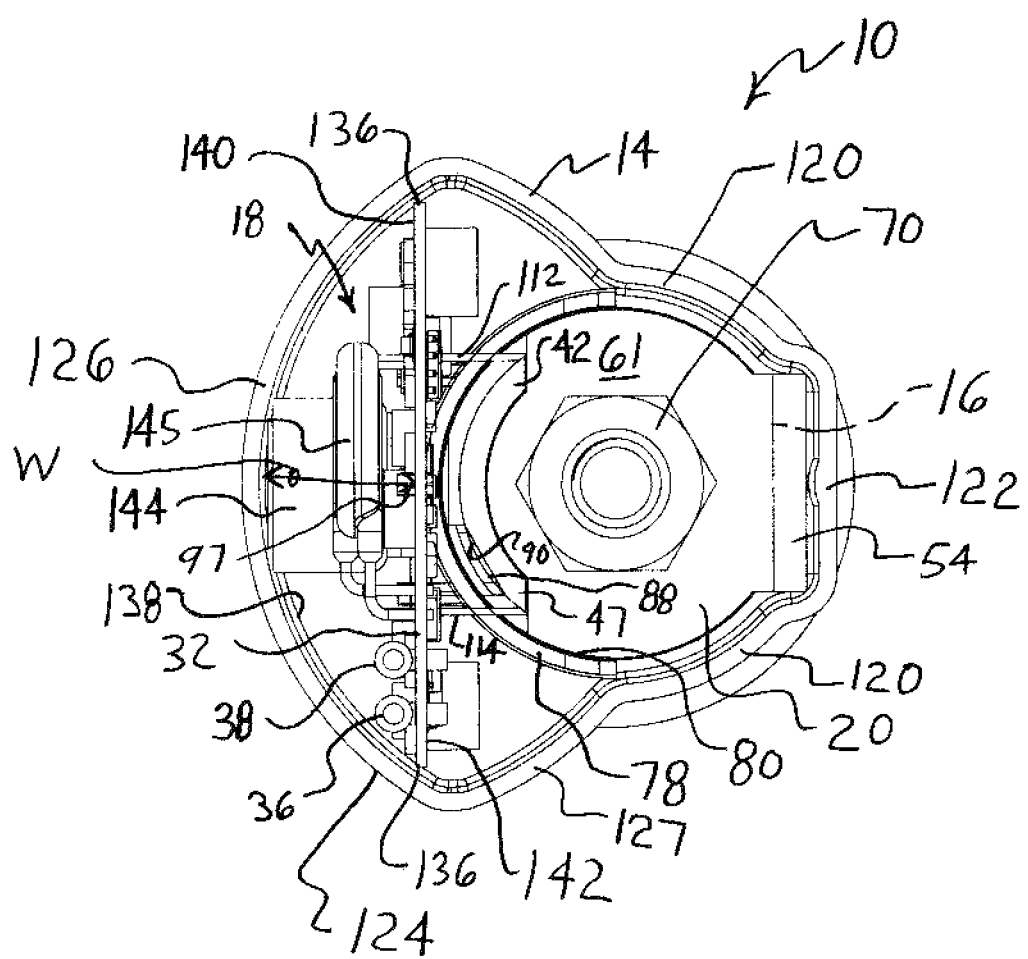
FIG. 15 illustrates a top plan view of one embodiment of the integrated irrigation valve control device of FIG. 10 and the components therein before sealant or potting material is placed in the housing.
Figure 16:
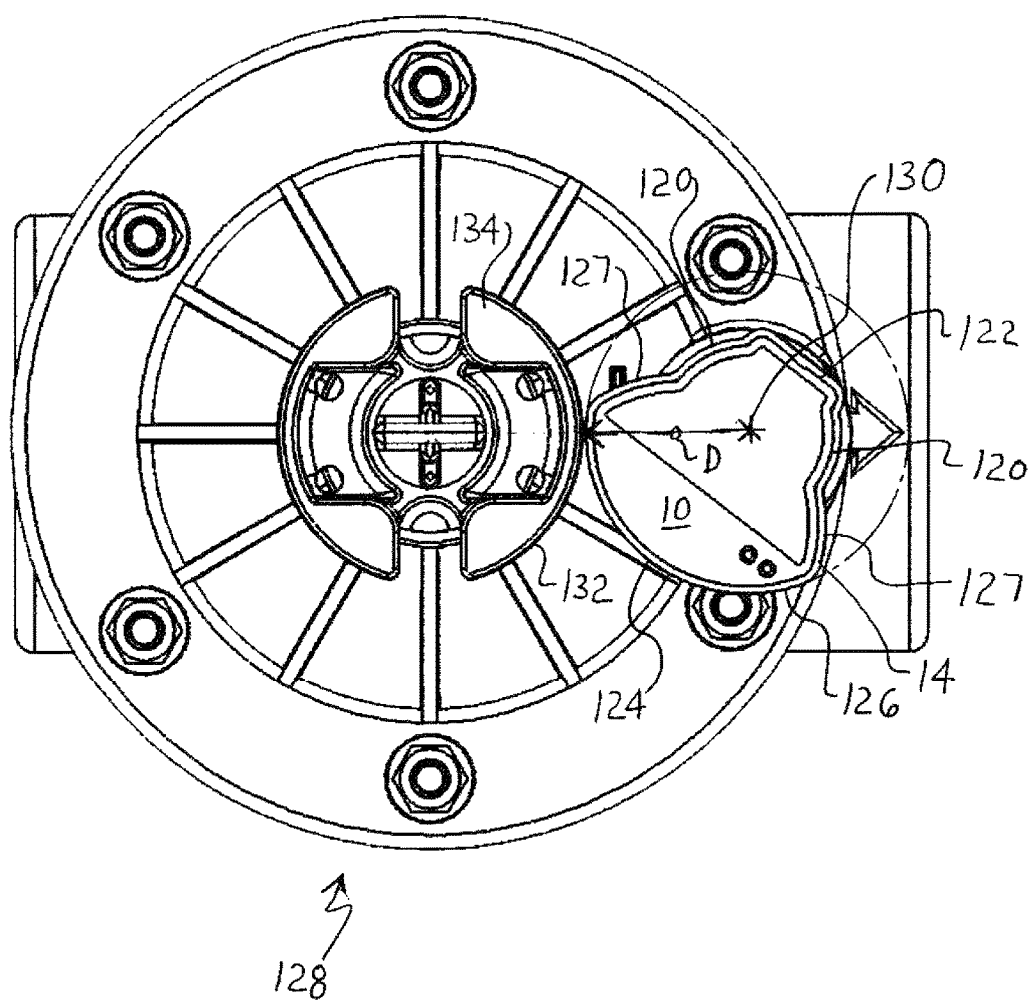
FIG. 16 illustrates a top plan view of one embodiment of the integrated irrigation valve control device of FIG. 10 mounted on a valve assembly.

Referring to FIGS. 15 and 17-18, with the maximum radius of the outer wall 126 being one of the key design limitations of some embodiments and with the radius set as above, the electronic components 34 are arranged on the circuit board 32 for the circuit board 32 to fit in the space behind the outer wall 126. Thus, the circuit board 32 is sized so that the outer wall 126 can maintain its substantially constant radius. The outer wall 126 extends adjacent opposite lateral edges 136 of the circuit board 32 while forming a gap 138 with a varying width between the outer wall 126 and the circuit board 32. The electronic components 34 are disposed on the circuit board 32 in locations to provide clearance for the outer wall 126. Thus, the electronic components 34 are disposed on both of two main opposite surfaces 140 and 142 of the circuit board 32. Also, the largest electronic components 144, such as capacitors, are disposed at the widest location W of the gap 138 between the outer wall 126 and the circuit board 32. The relatively large surge absorber 145 is also placed along the widest part W of the gap. In the present form, the widest location W of the gap 128 is located approximately at a lateral midpoint between the lateral edges 136 of the circuit board 32.

Figure 10:
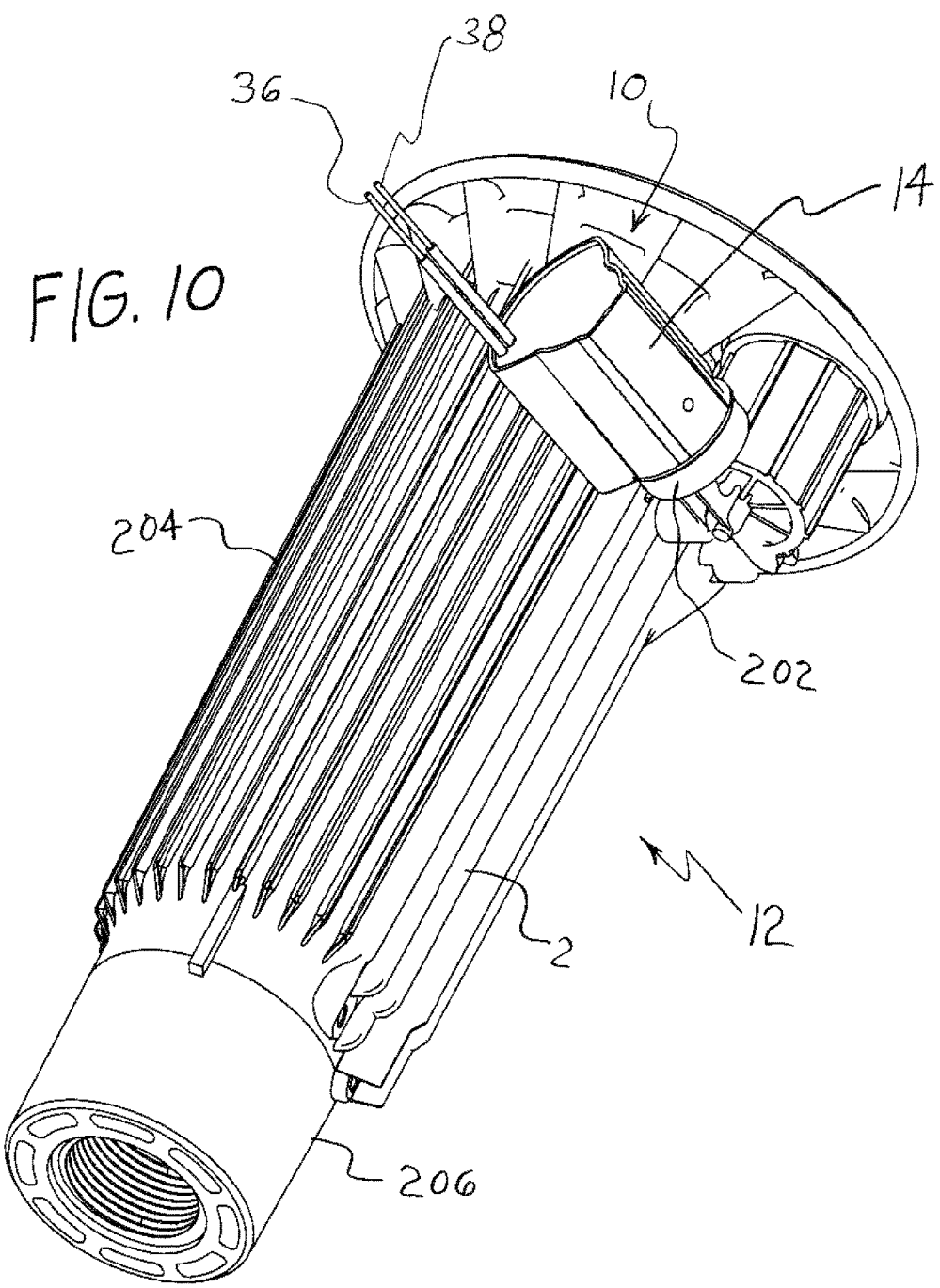
FIG. 10 illustrates a lower side perspective view of a form of an integrated irrigation valve control device mounted on a sprinkler assembly in accordance with one or more additional embodiments of the invention.
Figure 11:
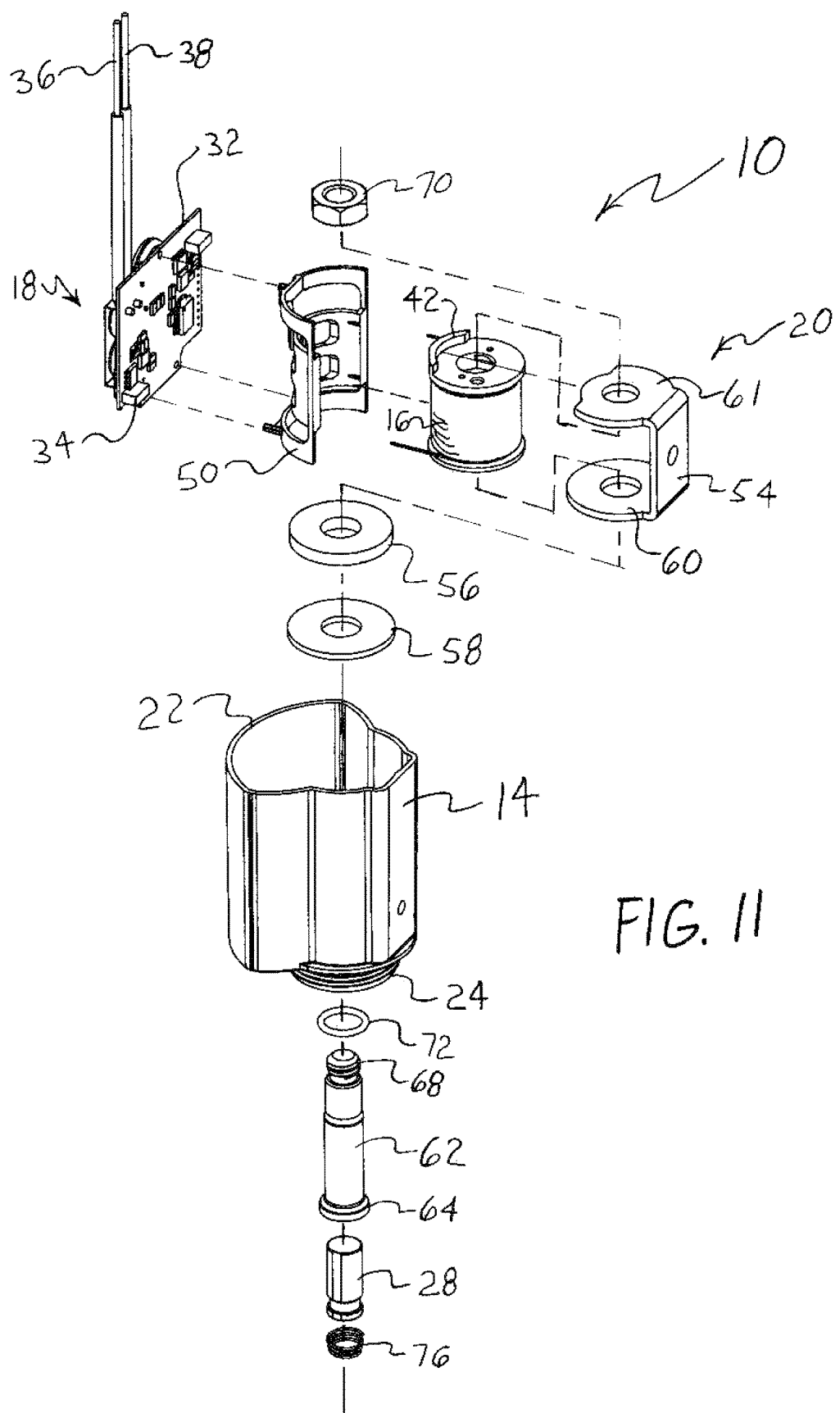
FIG. 11 illustrates an exploded perspective view of one embodiment of the integrated irrigation valve control device of FIG. 10.

Referring to FIGS. 17-18, front and rear elevational views of one embodiment of the control circuitry of the integrated irrigation valve control device of FIG. 10 are shown. In these illustrations, various electrical components are illustrated in their arrangement on the circuit board 32 in order to provide minimal footprint control circuitry 18. In the front view of FIG. 17, illustrated are the largest electrical components 144 (i.e., capacitors) and the surge absorber 145. In one embodiment, the capacitors are 50V electrolytic capacitors. Other components not yet specifically mentioned include optocoupler 770 positioned under the surge absorber 145, crystal 772 (used as an oscillator for device timing), two diodes 774 (e.g., 1000 v, 1 amp diodes), and two resistors 776 (e.g., 1 W resistors). The rear view of FIG. 18 additionally illustrates two MOSFETs 778 (e.g., 50V, 3 amp MOSFETs), diodes 780 and controller 322 (e.g., see controller 322 (e.g., see controller 322 described in FIG. 19 below, and including one or more elements 324, 340, 330, 332 and 342 in FIG. 19).

Referring to FIG. 19, a functional block diagram is shown of one embodiment of the control circuitry 18 shown in FIGS. 17-18 for an integrated valve control device 10. As described above, the integrated valve control device 10 couples with and controls actuation of a valve portion of irrigation equipment and further couples with a multi-wire interface, such as two-wire interface or control wire path 901, to receive power as well as irrigation control instructions, parameters and/or other such communications. In the illustrated embodiment, the integrated valve control device 10 includes the control circuitry 18 and the solenoid assembly 20 (e.g., actuator 356) at least partially covered by the housing 14. The valve portion (valve 320) is coupled to the actuator 356. The control circuitry 18 is formed on or coupled to the circuit board 32.

The integrated valve control device 10 includes an interface 326, a current feedback 328, a filter 325, an attenuator 336, an energy reserve 352, driver circuits 354, actuator 356 (e.g., the solenoid assembly 20), an irrigation valve 320 and a demodulator 360. In the illustrated embodiment, the demodulator 360 includes a controller 322, one or more memory 324, an Analog to Digital conversion unit 330, a zero-cross detector 332, one or more timers 340 (such as crystal-based clocks), and a device ID comparator 342. Under control of the controller 322, the valve control device 10 can at least activate and deactivate irrigation by controlling water flow through the valve 320. The components of the valve control device can be coupled through one or more direct connections, busses and/or other relevant coupling. The energy reserve 352 and/or other back up power provides power to allow the valve control device 10 to turn on/off irrigation or initiate/terminate irrigation according to locally stored irrigation scheduling should power over the two-wire interface be interrupted. Power from the two-wire interface can, in some instances, be used to store power in the energy reserve 352. While one energy reserve 352 is illustrated, it is understood that the energy reserve 352 may comprise multiple energy reserves. The energy reserve 352 may include one or both of a battery and capacitor. In preferred form, the one or more energy reserves 352 rectifies an incoming sinusoidal alternating power signal and includes one or more capacitors 144 that are charged by power received from the two wire interface and discharged using the driver circuits 354 to provides bursts of energy to open and close the actuator 356, e.g., a latching solenoid/solenoid assembly 20, controlling the irrigation valve 320. In some embodiments, the energy reserve 352 stores power to provide DC power to the demodulator 360 and other components of the device 10. The energy storage 352 can provide power in the event of disruption of power from the two wire interface. In FIG. 19, all components except the valve 320 are at least partially covered by the housing 14.

The valve control device 10 can be implemented through hardware, software, firmware or a combination of hardware, software and firmware. In some implementations, one or more components of the valve control device 10 are implemented through a single microprocessor, integrated circuit, microcontroller or other device. Additionally or alternatively, one or more of the components of the valve control device 10 can be integrated with the controller 322. For example, some or all of the memory 324, the zero-cross detector 332, the conversion unit 330, the timer 340, ID comparator 342, the driver circuits 354 and/or other components could be implemented in whole or in part through the controller 322. The valve control device 10, can in some implementations, include a demodulator 360 that comprises one or more components in demodulating the received input signal, such as the controller 322, the memory 324, the conversion unit 330, the zero-cross detector 332, the ID comparator 342 and/or one or more timers 340. In some embodiments, many of the components of the valve control device 10 are implemented through a microcontroller, such as one of the series of PIC16F677, 687, 689 manufactured by Microchip Technology, Inc. of Chandler, Ariz. or other similar controller.

The controller 322 can be implemented through one or more processors, microprocessors, microcontrollers, state machines or other such relevant controllers or combinations of controllers that provide overall functionality, data processing, and control over the valve control device 10. The one or more memory 324 can store software programs, executables, data, irrigation control programming, scheduling, runtime parameters, soil conditions and parameters, other relevant programs and data, and instructions executable by a processor, machine or computer. The memory can be implemented through ROM, RAM, EEPROM, volatile disk drives, flash memory, removable medium (e.g., floppy disc, hard disc, compact disc (CD), digital versatile disc (DVD), flash memory, and the like), and substantially any other relevant memory or combinations of memory. Generically, the memory 324 may also be referred to as a computer readable medium.

As introduced above, the controller and/or other components of the valve control device 10 can be implemented by software stored in memory and executed on a microcontroller or processor, or otherwise stored and executed in firmware. Further, the controller and/or other components can be implemented through logic devices, hardware, firmware and/or combinations thereof. Thus, the processing described herein may be performed using substantially any relevant processor logic or logic circuitry.

The modulated alternating signal is received at the interface 326 (e.g., input control connection 40 and/or wires 36 and 38) from the two wire interface. In one embodiment, the interface 326 is simply a physical connection point, connector or coupler for electrically and mechanically coupling the multi wire control path to the valve control device 10. In normal operation, the received alternating signal passes through the optional current feedback 328 and is filtered by the filter 325, attenuated by the attenuator 336, and converted by the conversion unit 330. The attenuator 336 attenuates the signal generating a data signal (VDATAF) that is at a level that is more readily utilized by the valve control device 10. For example, in some instances, the voltage is attenuated to a level that can be utilized in integrated circuits, such as about 5V or less. Further in some embodiments, the conversion unit 330 identifies or extracts an input signal reference voltage (VREFF) as a reference level and/or bias level in further processing the input signal.

In one embodiment, the zero-cross detector 332 monitors input 326 and informs the controller 322 when a positive going voltage has crossed from negative to positive. The timer 340 indicates a desired delay after the zero crossing and the controller 322 uses the analog to digital conversion unit 330 to measure the voltage level. In one embodiment, the controller 322 compares this measured voltage to a threshold voltage level set in the memory 324. This voltage level is used to determine clipped waveforms representing logic "0" or non-clipped waveforms representing logic "1".

Data bits encoded on the signal can further activate or awaken at least a portion of the valve control device 10 from a dormant or sleep state that significantly reduces power consumption. The timer 340, in some embodiments, is utilized in cooperation with the controller 322 to identify data bits and/or synchronization based on one or more time thresholds, for example, time since a detection of a data bit. The timer 340 can also further activate or awaken at least a portion of the valve control device 10 from a dormant or sleep state that significantly reduces power consumption.

The ID comparator 342 extracts data from the received bits to determine whether the communication modulated on the input signal is directed to the valve control device 10 and/or identifies parameters, instructions and/or requests. The controller 322 can implement one or more instructions, such as activating or deactivating one or more field stations 130, adjust parameters and/or implement other operations.

In some cases it is desirable for valve control device 10 to provide feedback to the entity providing input signal (e.g., irrigation controller 902 or other irrigation control unit or controller interface). For example, it is common for the valve control devices to acknowledge that they received and executed commands and instructions provided by the irrigation controller 902. This feedback may occur by the valve control device shunting the power line (at wires 36 and 38) through a resistor used to receive input signal, which provides current feedback to the irrigation control system. That is, the shunting or shorting of the power lines causes a current draw (voltage drop) at a designated time that is detected by controller 902 or other device containing a modulator. In the embodiment of FIG. 19, the optional current feedback 328 provides the shunting as directed by the controller 322 during designated feedback or communication times. In one embodiment, the current feedback 328 includes a switch (for example, an electronic switch, such as a triac) and resistor (not shown), the switch selectively coupling the two wires of the two wire interface 901 together through the resistor when directed by the controller 322. An example of one embodiment of a modulated waveform used to provide power and communicate data as well as allow for current feedback is provided in application Ser. No. 12/505, 401, filed Jul. 17, 2009, and entitled "DATA COMMUNICATION IN A MULTI-WIRE CONTROL SYSTEM," which is assigned to Rain Bird Corporation, this application is incorporated herein by reference.

In FIG. 19, valve control device 10 is shown having energy reserve 352 in communication with conversion unit 330 via attenuator 336, which operates under the control of controller 322. The controller 322 also controls the driver circuits 354 to activate and deactivate irrigation. Energy reserve 352 is shown to provide power to actuator 356 controlling the valve 320 via driver circuits 354. Energy reserve 352 is charged by the alternating power signal received at the interface 326.

In an embodiment, the energy reserve 352 functions as a stored energy source or as a stored energy reserve providing power to the actuator 356, for example, a latching solenoid (solenoid assembly 20) or non-latching solenoid, to open and/or close an associated irrigation valve (e.g., valve 320) to effect irrigation. The energy reserve may be implemented using a device (e.g., a battery and/or capacitor (e.g., capacitors 144)) capable of providing desired power to the actuator.

If desired, energy reserve unit 352 may be implemented using one or more additional energy reserves (i.e., in addition to energy reserve 352). Such additional energy reserves may be used to power actuator 356 as needed or desired. An example of a technique for implementing this multiple energy reserve aspect is disclosed in copending application Ser. No. 12/341,764, filed Dec. 22, 2008, and entitled "LATCHING SOLENOID ENERGY RESERVE," which is assigned to Rain Bird Corporation, which is the assignee of the present disclosure, this application is incorporated herein by reference.

As noted above, actuator 356 is usually coupled to a suitable irrigation valve, such as valve 320, which in turn is coupled to a water supply line on one end and to one or more water delivery devices on the other end.

Actuator 356 is typically implemented using a latching solenoid (e.g., see the solenoid assembly of FIGS. 10-16) which requires a certain amount of energy to open and close. A feature of the latching solenoid is that it may be configured to control water flow to one or more water delivery devices. In one position (e.g., the open position), the actuator (e.g., latching solenoid) causes the valve to be in an open valve position to allow water flow therethrough. In another position (e.g., the closed position), the actuator (e.g., latching solenoid) causes the valve to be in a closed valve position which prevents the flow of water therethrough. A latching solenoid generally has lower power demands as compared to a typical non-latching solenoid. For instance, a typical non-latching solenoid requires continual power to maintain the open valve position, the removal of power putting the valve in the closed valve position. Latching solenoids, on the other hand, only require a power burst to open or close; no power is needed to maintain the latching solenoid (and thus, the valve) in the open or closed position.

Accordingly, capacitors are well suited energy storage devices useful to provide the short burst of power needed to move the actuator 356. For example, in some embodiments, the energy reserve 352 includes a capacitor (e.g., capacitors 144) that is charged using the received alternating power signal. The capacitor is discharged to provide the current burst needed to actuate the latching solenoid. Once discharged, the capacitor immediately draws power from the alternating power signal to recharge.

With the configuration as described, when the spacer 50 is present, the coil 16, bobbin 42, and bracket 54 are assembled together and mounted on the spacer 50. The coil wires 112 and 114 are then attached to the control circuitry 18 at the connection points 118. The control circuitry 18, spacer 50, and coil 16 are then placed into the housing 14 by simultaneously mounting the coil 16 on the core tube 62, sliding the circuit board 32 next to outer wall 126, and sliding the bracket 54 against flat mid wall 122. The jam nut 70 is then tightened to the core tube to secure the solenoid assembly 20 to the housing 14, and the plunger or valve member 28 is placed into the aperture 26 and core tube 62 as described above. The housing 14 is then filled with the potting material 52.

Alternatively without any spacer, the process is generally the same except that the circuit board 32 should be held away from the solenoid assembly while the housing 14 is being filled with the potting material 52 so that the potting material can be inserted between the control circuitry 18 or circuit board 32 and the solenoid assembly 20.

As yet another alternative structure, the spacer 50 may be integrally formed with, or otherwise part of, bobbin 42. In one possible embodiment, the spacer merely includes legs or pads extending laterally from the flanges 46 and 48 of the bobbin 42 for engagement with the circuit board 32 to hold the bobbin 42, and in turn the coil 16, a certain distance from the circuit board 32. In this case, the coil wires 112 and 114 may have had leads to attach to the circuit board 32. In other embodiments, such a spacer that is part of the bobbin may include other frame members for increased rigidity, similar to spacer 50, as well as the legs. In some embodiments, other structural devices serving functionality of the spacer may be used instead of or in addition to a spacer. Further, in some embodiments, the spacer includes multiple pieces or portions. For example, there may be structure on the inside of the housing 16 to which the circuit board 32 is fixed and additional structure on the inside of the housing 16 to which the coil 16 and/or bobbin 42, etc. are fixed. In some embodiments, the spacer (or components functioning as a spacer) functions at least in part to secure the circuit board 32 in a spaced relationship relative to the coil 16.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation control device comprising:
    a coil configured to develop an electromagnetic flux sufficient to cause actuation of irrigation equipment;
    control circuitry electrically coupled to the coil and configured to receive, at input connections, modulated power signals from an external irrigation control unit of an irrigation control system via a control wire path coupled to the input connections, wherein the control circuitry is configured to derive control signals from the modulated power signals received from the control wire path and based on the control signals, output signaling to the coil to control the electromagnetic flux at the coil; and
    a housing covering at least a portion of the coil and at least a portion of the control circuitry, the housing having:
        a wall portion including a flat mid-wall generally extending around a portion of the coil and a pair of curved walls extending from the flat mid-wall and generally extending around a portion of the coil and generally corresponding to a curvature of the portion of the coil;
        a radially expanded portion including a curved wall positioned opposite the flat mid-wall and generally extending around the control circuitry; and
        a pair of curved walls extending from a respective one of the curved walls that extend from the flat mid-wall and connect the curved walls that extend from the flat mid-wall to the curved wall of the radially expanded portion, the curved walls that extend from the curve walls extending from the flat mid-wall generally extending around a portion of the coil and generally extending around a portion of the circuitry.

2. The irrigation control device of claim 1 wherein the housing is an integrally formed one-piece housing.

3. The irrigation control device of claim 1 wherein any electrical connection between the coil and the control circuitry remains within the housing.

4. The irrigation control device of claim 1 wherein the control circuitry comprises a circuit board and electronics mounted on the circuit board, and wherein the housing is sized to cover the entire circuit board and the entire coil.

5. The irrigation control device of claim 1 wherein the coil comprises a side and a total longitudinal length, and wherein the control circuitry extends along the side and has a total longitudinal length no more than approximately twice the longitudinal length of the coil.

6. The irrigation control device of claim 1 further comprising a curable potting material disposed at least between the control circuitry and the coil and within the housing.

7. The irrigation control device of claim 6 wherein the potting material sufficiently fills the housing so that the control circuitry and the coil remain substantially fixed to each other.

8. The irrigation control device of claim 6 wherein the control circuitry includes a circuit board and electronic components mounted on the circuit board, the device further comprising a spacer arranged to maintain the circuit board spaced from the coil, and wherein only the spacer and the potting material are placed directly between the control circuitry and the coil.

9. The irrigation control device of claim 1, wherein the control wire path further comprises at least one input control wire coupled to the control circuitry and extending out of the housing for connection to an irrigation control system.

10. The irrigation control device of claim 1 wherein the control circuitry is configured to receive the modulated power control signals and derive the control signals therefrom, wherein the control signals are addressed to and intended for use by the control circuitry.

11. The irrigation control device of claim 10, wherein the control circuitry is configured to receive the modulated power control signals and derive the control signals therefrom, wherein the modulated power control signals contain other control signals not intended for use by the control circuitry, wherein the control circuitry is not responsive to the other control signals.

12. The irrigation control device of claim 1, wherein the control circuitry is one of a plurality of other control circuits of other irrigation control devices also configured to be coupled to the control wire path.

13. The irrigation control device of claim 1, wherein the external irrigation control unit of the irrigation control system is directly coupled to a plurality of other control circuits of other irrigation devices via the control wire path.

14. The irrigation control device of claim 1, wherein the housing is directly coupled to a valve assembly to be actuated by the electromagnetic flux of the coil.

15. The irrigation control device of claim 1 wherein the modulated power signals are modulated with data, and wherein the control circuitry is configured to derive the data from the modulated power signals, the data corresponding to the control signals, and based on the control signals, output the signaling to the coil to control the electromagnetic flux at the coil.

16. The irrigation control device of claim 1, wherein at least a portion of the coil is positioned in the expanded portion of the housing and is electrically connected to the control circuitry in the expanded portion of the housing.

17. The irrigation control device of claim 1, wherein the curved walls extending from the flat mid-wall extend in a divergent orientation relative to each other thereby expanding the housing, and wherein the curved walls extending from the respective ones of the pair of curved walls toward the curved wall of the radially expanded portion extend in a divergent orientation relative to each other thereby further expanding the housing.

18. A method of making an irrigation control device comprising:
holding a solenoid assembly with a coil near to control circuitry for controlling an electromagnetic flux at the coil, the control circuitry having input connections adapted to be coupled to an external irrigation control unit of an irrigation control system via a control wire path to be coupled to the input connections;
electrically connecting the coil to the control circuitry;
placing the solenoid assembly and control circuitry into a housing, the housing having:
a wall portion including a flat mid-wall generally extending around a portion of the coil and a pair of curved walls extending from the flat mid-wall and generally extending around a portion of the coil and generally corresponding to a curvature of the portion of the coil;
a radially expanded portion including a curved wall positioned opposite the flat mid-wall and generally extending around the control circuitry; and
a pair of curved walls extending from a respective one of the curved walls that extend from the flat mid-wall and connect the curved walls that extend from the flat mid-wall to the curved wall of the radially expanded portion, the curved walls that extend from the curve walls extending from the flat mid-wall generally extending around a portion of the coil and generally extending around a portion of the circuitry;
securing the solenoid assembly to the housing so that the solenoid assembly can be actuated to reciprocate a valve member through an aperture in the housing to selectively engage a valve seat; and
fixing the control circuitry and coil within the housing;
wherein the control circuitry is configured to receive, at the input connections, modulated power signals from the external irrigation control unit via the control wire path coupled to the input connections, and wherein the control circuitry is configured to derive control signals from the modulated power signals and based on the control signals, output signaling to the coil to control the electromagnetic flux at the coil.

19. The method of claim 18 wherein the housing is a one-piece housing.

20. The method of claim 18 wherein the housing is a one-piece housing.

21. The method of claim 18 wherein the valve seat is secured to, and movable with, the housing.

22. The method of claim 18, wherein the housing is directly coupled to a valve assembly to be actuated by the electromagnetic flux of the coil.

23. The method of claim 18 wherein the fixing of the control circuitry and coil within the housing comprises at least partially filling the housing with a curable material.

24. The method of claim 18 further comprising placing the control circuitry along a side of the coil so that the longitudinal lengths of the coil and the control circuitry overlap.

25. The method of claim 18, wherein at least a portion of the coil is positioned in the expanded portion of the housing and is electrically connected to the control circuitry in the expanded portion of the housing.

26. The method of claim 18, wherein the curved walls extending from the flat mid-wall extend in a divergent orientation relative to each other thereby expanding the housing, and wherein the curved walls extending from the respective ones of the pair of curved walls toward the curved wall of the radially expanded portion extend in a divergent orientation relative to each other thereby further expanding the housing.

* * * * *